(12) United States Patent
Mui et al.

(10) Patent No.: US 8,359,313 B2
(45) Date of Patent: Jan. 22, 2013

(54) EXTENSIBLE CUSTOM VARIABLES FOR TRACKING USER TRAFFIC

(75) Inventors: Lik Mui, Hayward, CA (US); Sagnik Nandy, Los Gatos, CA (US); Hui Sok Moon, San Jose, CA (US); Japjit Tulsi, Los Altos, CA (US); Kasem Marifet, Costa Mesa, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/907,953

(22) Filed: Oct. 19, 2010

(65) Prior Publication Data

US 2011/0093461 A1    Apr. 21, 2011

Related U.S. Application Data

(60) Provisional application No. 61/253,476, filed on Oct. 20, 2009.

(51) Int. Cl.
*G06F 17/30* (2006.01)
(52) U.S. Cl. .................................................. 707/736
(58) Field of Classification Search ................ 707/1, 10, 707/736; 715/517, 738; 702/186
See application file for complete search history.

(56) References Cited

U.S. PATENT DOCUMENTS

| | | | |
|---|---|---|---|
| 5,870,746 A | 2/1999 | Knutson et al. | 707/101 |
| 6,392,668 B1 * | 5/2002 | Murray | 715/738 |
| 7,085,682 B1 * | 8/2006 | Heller et al. | 702/186 |
| 7,627,572 B2 | 12/2009 | Bohannon | |
| 7,669,212 B2 | 2/2010 | Alao et al. | |
| 7,673,340 B1 * | 3/2010 | Cohen et al. | 726/22 |
| 2005/0114206 A1 | 5/2005 | Bennett et al. | |
| 2006/0074905 A1 | 4/2006 | Yun et al. | 707/5 |
| 2006/0074910 A1 | 4/2006 | Yun et al. | 707/7 |
| 2006/0085741 A1 * | 4/2006 | Weiner et al. | 715/517 |
| 2006/0277197 A1 * | 12/2006 | Bailey | 707/10 |
| 2006/0277585 A1 | 12/2006 | Error et al. | |
| 2007/0185826 A1 * | 8/2007 | Brice et al. | 707/1 |
| 2008/0140524 A1 | 6/2008 | Anand et al. | |

(Continued)

FOREIGN PATENT DOCUMENTS

| | | |
|---|---|---|
| KR | 10-0695467 B1 | 3/2007 |
| WO | WO 02/27528 A1 | 4/2002 |

(Continued)

OTHER PUBLICATIONS

International Search Report and Written Opinion for PCT/US2010/053417 dated May 30, 2011, 8 pgs.

(Continued)

*Primary Examiner* — Etienne Leroux
(74) *Attorney, Agent, or Firm* — Morgan, Lewis & Bockius LLP

(57) ABSTRACT

A system and method for presenting custom variables to a user of a web analytics system. An activity file of a web server is received, wherein the activity file includes activity file hit records that provide information about respective requests for documents made by visitors of web sites. A custom variable tag of an activity file hit record in the activity file is identified. Attribute-value pairs of the custom variable tag are then extracted. The attribute-value pairs of the custom variable tag are stored in a database hit record of a database of the server. One or more attribute-value pairs of a plurality of custom variable tags assigned to the custom variable of the web site are then prepared to be presented to a user, wherein the user is separate and distinct from the authors of the documents of the web site.

22 Claims, 17 Drawing Sheets

U.S. PATENT DOCUMENTS

| | | |
|---|---|---|
| 2008/0208910 A1 | 8/2008 | MacIntyre et al. |
| 2008/0275980 A1 | 11/2008 | Hansen .................. 709/224 |
| 2010/0205029 A1 | 8/2010 | Asherman et al. |
| 2011/0035272 A1 | 2/2011 | Bhatt et al. |

FOREIGN PATENT DOCUMENTS

| | | |
|---|---|---|
| WO | WO 2006/133218 A2 | 12/2006 |
| WO | WO 2006/133219 A2 | 12/2006 |

OTHER PUBLICATIONS

International Search Report and Written Opinion for International Application No. PCT/US2010/047341, mailed Dec. 16, 2010, 9 pages.

* cited by examiner

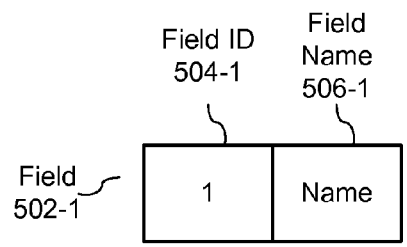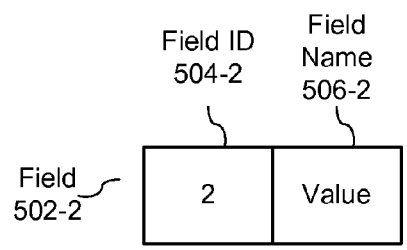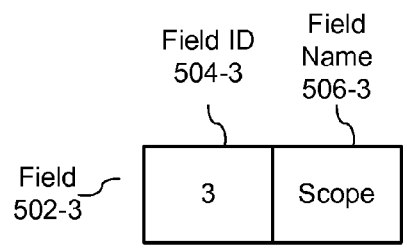
Figure 5

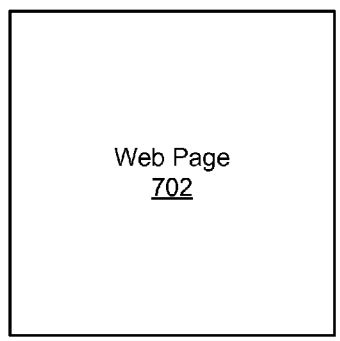
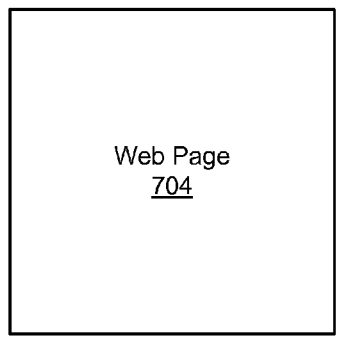
| key_1_1 = Author | key_2_1 = Cathy | key_3_1 = Hit |
| key_1_2 = Gender | key_2_2 = Female | key_3_2 = Visitor |
| key_1_3 = Category | key_2_3 = Science | key_3_3 = Hit |
| key_1_1 = Color | key_2_1 = Red | key_3_1 = Hit |
| key_1_2 = Gender | key_2_2 = Male | key_3_2 = Visitor |
| key_1_3 = Category | key_2_3 = Sports | key_3_3 = Hit |
Figure 7

Custom Variables Data Steructure 800

| Field 802-1 | Field 802-2 | Field 802-3 | ... | Field 802-N | Variable Index 804 | Hits 806 |

Figure 8

Custom Variables Table 900

| Name 902 | Value 904 | Scope 906 | Variable Index 908 | Hits 910 |
|---|---|---|---|---|
| Author | Cathy | Hit | 1 | 1 |
| Author | Joe | Hit | 1 | 6 |
| Author | Nancy | Hit | 1 | 3 |
| Color | Blue | Hit | 1 | 1 |
| Color | Red | Hit | 1 | 1 |
| Gender | Female | Visitor | 2 | 54 |
| Gender | Male | Visitor | 2 | 45 |
| Age | 18-24 | Visitor | 2 | 12 |
| Age | 25-35 | Visitor | 2 | 71 |
| Category | Local | Hit | 3 | 5 |
| Category | Sports | Hit | 3 | 7 |
| Category | Science | Hit | 3 | 7 |

CV 1: rows 1-5
CV 2: rows 6-9
CV 3: rows 10-12

Figure 9

EXTENSIBLE CUSTOM VARIABLES FOR TRACKING USER TRAFFIC

PRIORITY

This application claims priority under 35 U.S.C. 119(e) to U.S. Provisional Patent Application 61/253,476 filed Oct. 20, 2009, which is hereby incorporated by reference in its entirety.

TECHNICAL FIELD

The disclosed embodiments relate generally to custom variables for web analytics. In particular, the disclose embodiments relate to providing a system and method for presenting and providing access to custom variables for tracking user traffic.

BACKGROUND

Web analytics systems allow an operator of a web site to obtain statistics about requests for web pages made by visitors of the web site. The statistics may be generated from predetermined variables that are defined by the web analytics system or custom variables defined by authors (or content providers) of web pages for the web site. The operator of the web site typically purchases a specified number of custom variables and the authors define and assign specific attribute-value pairs to the custom variables. The authors are typically in the best position to define and assign custom variables to the content of a web page for the web site because the authors are most familiar with the contents of the web page. For example, the authors are typically in the best position to assign categories to a web page that the author has written. In many cases, the operator of a web site is a separate and distinct entity from an author (or content provider). Thus, the operator of the web site may not have knowledge of the attribute-value pairs assigned to a particular custom variable. In these cases, the operator of the web site is not able to generate reports based on specific attribute-value pairs of the custom variables because the attribute-value pairs are unknown to the operator of the web site.

SUMMARY

Some embodiments provide a system, a computer readable storage medium including instructions, and a method for presenting custom variables to a user of a web analytics system. An activity file of a web server is received, wherein the activity file includes activity file hit records that provide information about respective requests for documents made by visitors of web sites. A custom variable tag of an activity file hit record in the activity file is identified, wherein the activity file hit record is associated with a web site, wherein the custom variable tag is defined by an author of a document of the web site, and wherein the custom variable tag is assigned to a custom variable of the web site. Attribute-value pairs of the custom variable tag are then extracted, wherein the attributes of the custom variable tag include at least a name attribute, a value attribute, and a scope attribute. The attribute-value pairs of the custom variable tag are stored in a database hit record of a database of the server, wherein the database includes a plurality of database hit records including a plurality of attribute-value pairs extracted from a plurality of activity file hit records. One or more attribute-value pairs of a plurality of custom variable tags assigned to the custom variable of the web site are then presented to a user, wherein the user is separate and distinct from the authors of the documents of the web site.

In some embodiments, the activity file hit record includes one or more predetermined variable tags that are assigned to corresponding predetermined variables, and wherein the one or more predetermined variable tags are defined by a web analytics system.

In some embodiments, attribute-value pairs of the one or more predetermined variable tags are extracted. The attribute-value pairs of the one or more predetermined variable tags are then stored in database hit records.

In some embodiments, the activity file hit record includes one or more additional custom variable tags. In these embodiments, attribute-value pairs of the one or more additional custom variable tags are extracted. The attribute-value pairs of the one or more additional custom variable tags are then stored in database hit records.

In some embodiments, a selection of an attribute-value pair of the one or more attribute-value pairs is received from a user, wherein the selection indicates a request for web analytics data for the web site corresponding to the attribute-value pair. In response to the selection, the web analytics data for the web site is generated based on database hit records in the database that include the attribute-value pair.

In some embodiments, the web analytics data for the web site is generated by generating one or more charts based on the database hit records in the database that include the attribute-value pair.

In some embodiments, the web analytics data for the web site is generated by generating one or more graphs based on the database hit records in the database that include the attribute-value pair.

In some embodiments, the web analytics data for the web site is generated by generating one or more tables based on the database hit records in the database that include the attribute-value pair.

In some embodiments, the web analytics data for the web site is generated by calculating one or more statistics based on the database hit records in the database that include the attribute-value pair.

In some embodiments, a value corresponding to the name attribute of the custom variable tag specifies a name of an attribute for the custom variable tag.

In some embodiments, a value corresponding to the value attribute of the custom variable tag specifies a value corresponding to the name of the attribute for the custom variable tag.

In some embodiments, a value corresponding to the scope attribute of the custom variable tag is selected from the group consisting of: hit, indicating that the custom variable tag is related to a respective request for the document, session, indicating that the custom variable tag is related to a respective user session, and visitor, indicating that the custom variable tag is related to a respective user.

In some embodiments, the value of the scope attribute is session. In these embodiments, the attribute-value pairs of the custom variable tag is propagated to database hit records associated with the same session as the database hit record.

In some embodiments, the value of the scope attribute is visitor. In these embodiments, the attribute-value pairs of the custom variable tag is propagated to database hit records associated with the same visitor as the database hit record.

In some embodiments, the web site includes a plurality of custom variables. In these embodiments, attribute-value pairs of custom variable tags assigned to the plurality of custom variables of the web site are presented to a user.

In some embodiments, the custom variable tag includes a custom variable index attribute that includes a corresponding value specifying the custom variable with which the custom variable tag is associated.

In some embodiments, the number of custom variables for a respective document of the web site is less than a predetermined number.

In some embodiments, the document is associated with only one of the plurality of custom variable tags assigned to the custom variable of the web site.

In some embodiments, the custom variable tag is one of a plurality of custom variable tags that authors of documents of the web site have assigned to the custom variable.

In some embodiments, the user only obtains knowledge of the one or more attribute-value pairs of the plurality of custom variable tags after the one or more attribute-value pairs of the plurality of custom variable tags are presented to the user.

In some embodiments, it is determined whether the set of the values of the attribute-value pairs for the custom variable tag exist in a database record of a custom variable table of the database, wherein the custom variable table includes at least a name column corresponding to the name attribute, a value column corresponding to the value attribute, and a scope column corresponding to the scope attribute. If the set of the values of the attribute-value pairs for the custom variable tag does not exist in a database record of the custom variable table, the set of values of the attribute-value pairs of the custom variable tag is inserted into a new database record of the custom variable table.

Some embodiments provide a computer readable storage medium storing a data structure configured for use by a computer to store one or more attribute-value pairs associated with a plurality of custom variables. The data structure includes a name data field configured to store a value corresponding to a name attribute of a respective custom variable, a value data field configured to store a value corresponding to a value attribute of the respective custom variable, and a scope data field configured to store a value corresponding to a scope attribute of the respective custom variable.

BRIEF DESCRIPTION OF THE DRAWINGS

FIG. 5 is a block diagram of exemplary values for a custom variable tag metadata, according to some embodiments.

FIG. 7 is a block diagram illustrating a number of exemplary custom variable tags assigned to web pages of a web site, according to some embodiments.

FIG. 8 is a block diagram illustrating an exemplary data structure that stores attribute-value pairs of custom variable tags assigned to web pages, according to some embodiments.

FIG. 9 is a block diagram illustrating exemplary custom variables table storing exemplary attribute-value pairs of custom variable tags assigned to web pages of a web site, according to some embodiments.

Like reference numerals refer to corresponding parts throughout the drawings.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
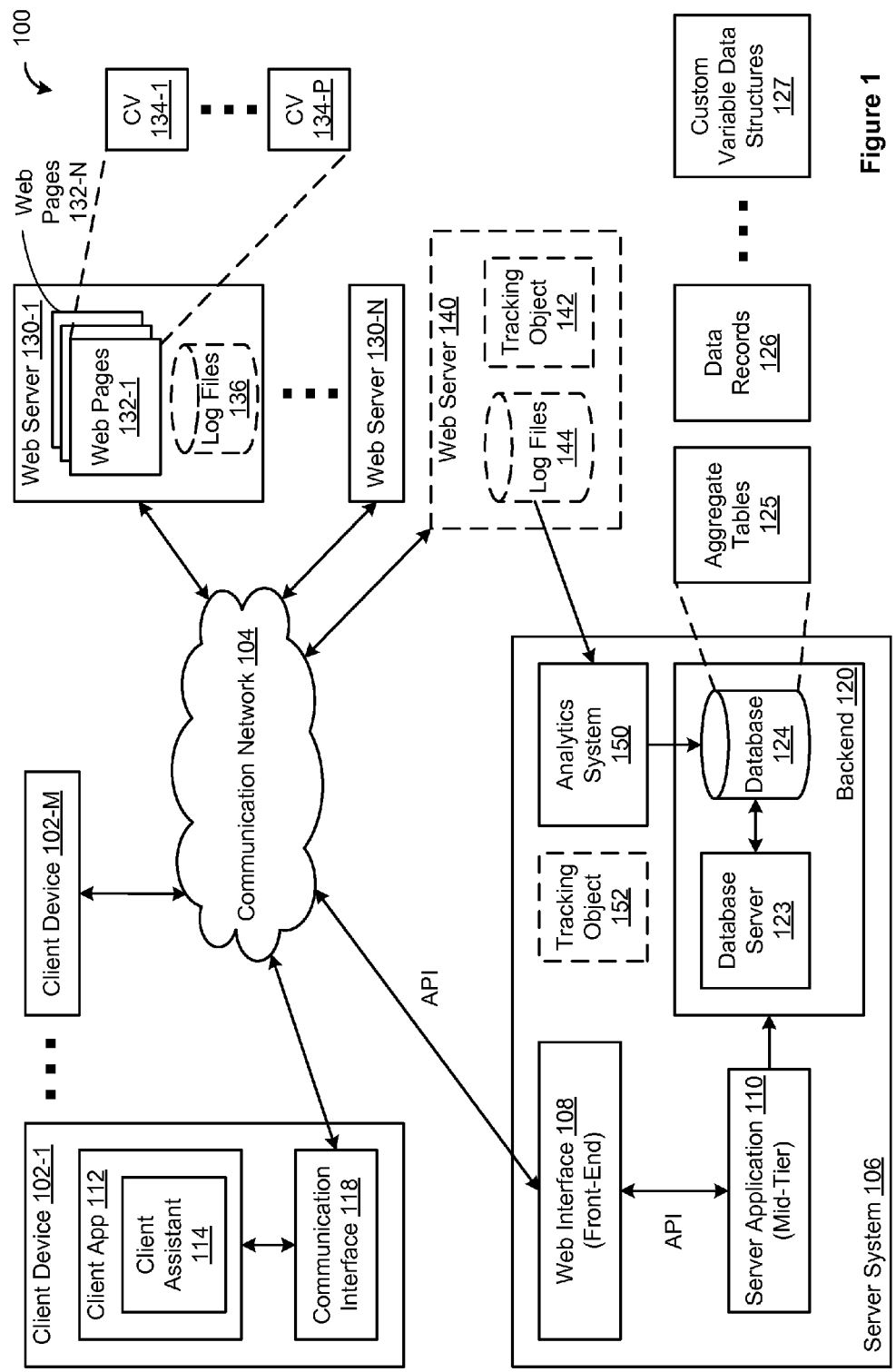
FIG. 1 is an overview block diagram of a client-server server system for presenting and providing access to custom variables for web analytics, according to some embodiments.

FIG. 1 is an overview block diagram of a client-server server system 100 for presenting and providing access to custom variables for web analytics in accordance with some embodiments. The client-server server system 100 includes a plurality of client devices 102 connected to a server system 106 through one or more communication networks 104.

A client device 102 (also known as a "client") may be any computer or similar device through which a user of the client device 102 can submit data access requests to and receive results or other services from the server system 106, web servers 130, and/or web server 140. Examples include, without limitation, desktop computers, laptop computers, tablet computers, mobile devices such as mobile phones, personal digital assistants, set-top boxes, or any combination of the above. A respective client 102 may contain at least one client application 112 for submitting requests to the server system 106, the web servers 130, and/or the web server 140. For example, the client application 112 can be a web browser or other type of application that permits a user to access the services provided by the server system 106, the web servers 130, and/or the web server 140.

In some embodiments, the client application 112 includes one or more client assistants 114. A client assistant 114 can be a software application that performs tasks related to assisting a user's activities with respect to the client application 112 and/or other applications. For example, the client assistant 114 may assist a user at the client device 102 with browsing information (e.g., web pages retrieved from the web servers 130 and/or 140), processing information (e.g., query results) received from the server system 106, and monitoring the user's activities on the query results. In some embodiments, the client assistant 114 is embedded in a web page (e.g., a query results web page) or other documents downloaded from the server system 106. In some embodiments, the client assistant 114 is a part of the client application 112 (e.g., a plug-in application of a web browser). The client 102 further includes a communication interface 118 to support the communication between the client 102 and other devices (e.g., the server system 106 or another client device 102).

The communication network(s) 104 can be any wired or wireless local area network (LAN) and/or wide area network (WAN), such as an intranet, an extranet, the Internet, or a combination of such networks. In some embodiments, the communication network 104 uses the HyperText Transport Protocol (HTTP) and the Transmission Control Protocol/Internet Protocol (TCP/IP) to transport information between different networks. The HTTP permits client devices to access various information items available on the Internet via the communication network 104. The various embodiments of the invention, however, are not limited to the use of any particular protocol.

In some embodiments, the server system 106 includes a web interface 108 (also referred to as a "front-end server"), a server application 110 (also referred to as a "mid-tier server"), and a backend server 120. The web interface 108 receives data access requests from client devices 102 and forwards the requests to the server application 110. In response to receiving the requests, the server application 110 decides how to process the requests including identifying data filters associated with a request, checking whether it has data available for the request, submitting queries to the backend 120 for data requested by the client, processing the data returned by the backend 120 that matches the queries, and returning the processed data as results to the requesting clients 102. After receiving a result, the client application 112 at a particular client 102 displays the result to the user who submits the original request.

In some embodiments, the backend 120 is effectively a database management system including a database server 123 that is configured to manage a database 124. In some embodiments, the database 124 is stored at the server system 106. In some embodiments, the database 124 is located on a computer system that is separate and distinct from the server system 106. In some embodiments, the database 124 includes aggregate tables 125. Aggregate tables include data that is aggregated on a periodic basis and allow the server system 106 to quickly provide results for data that is commonly requested. In some embodiments, the database 124 includes data records 126. In response to a query submitted by the server application 110, the database server 123 identifies zero or more data records that satisfy the query and returns the data records to the server application 110 for further processing. In some embodiments, the database 124 includes custom variable data structures 127. For example, the custom variable data structure 127 may include custom variable tag metadata 300, custom variables data structure 800, and custom variables table 900, as described in more detail with respect to FIGS. 3-9 below.

In some embodiments, the web servers 130 host and serve web pages 132 to users on client devices (e.g., the client devices 102). In some embodiments, a respective web page 132 is associated with custom variables 134. The custom variable 134 are variables that an operator of a web site may purchase from a web analytics provider. The custom variables 134 allow the operator of the web site to obtain additional information about traffic to the web site that is not included in the standard set of variables of the web analytics system. In some embodiments, a custom variable includes a set of attribute-value pairs that describe the content of a web page. In some embodiments, a custom variable include information about a visitor of the web page. An exemplary custom variable may be: "Name=Category," "Value=Sports," and "Scope=Hit." This exemplary custom variable includes three attribute-value pairs. The first attribute-value pair has an attribute "Name" and a corresponding value "Category," indicating that the attribute for this custom variable is "Category. The second attribute-value pair has an attribute "Value" and a corresponding value "Sports," indicating that the value of the attribute "Category" is "Sports" (i.e., a web page with this custom variable is related to a sports category). The third attribute-value pair has an attribute "Scope" and a corresponding value "Hit," indicating that this custom variable applies to all hits to a web page that includes this custom variable. The set of attribute-value pairs is also referred to as a custom variable tag in this specification. In some embodiments, an author of the respective web page 132 assigns a custom variable tag to each of the custom variables 134. Note that in general, an author is a content provider. In some embodiments, an operator of a web site is an author of a web page for the web site. In some embodiments, a custom variable tag includes a plurality of attribute-value pairs, as described below with respect to FIG. 3-7.

Typically a respective operator of a respective web site purchases a predetermined number of custom variables (e.g., ten custom variables) from a web analytics provider. To provide greater flexibility for the authors of the respective web site, some embodiments allow the authors of the respective web site to assign different sets of attribute-value pairs (e.g., a custom variable tag) to the custom variables of the web site. In some embodiments, a plurality of custom variable tags are assigned to each custom variable for the respective web site. For example, an author for a first web page of the respective web site may assign the following custom variable tag, including the following attribute-value pairs, to custom variable 1: "Name=Author," "Value=Phil," and "Scope=Hit," indicating that the name of the attribute for the custom variable is "Author," the value corresponding to the attribute is "Phil," and the scope of the custom variable is "Hit" (e.g., the custom variable only applies to this hit for the first web page). The author (or another author) or a second web page of the respective web site may assign the following custom variable tag, including the following attribute-value pairs, to custom variable 1: "Name=Author," "Value=Cathy," and "Scope=Hit," indicating that the name of the attribute for the custom variable is "Author," the value corresponding to the attribute is "Cathy," and the scope of the custom variable is "Hit" (e.g., the custom variable only applies to this hit for the second web page). Thus, a single custom variable may be associated with one or more custom variable tags (e.g., sets of attribute-value pairs). In some embodiments, even though a plurality of custom variable tags may be assigned to a respective custom variable, only one custom variable tag for each custom variable may be assigned to a respective web page. Continuing the example from above, even though custom variable 1 is associated with two custom variable tags, only one of the custom variable tags for custom variable 1 may be assigned to a respective web page.

In some embodiments, the server system 106 is an application service provider (ASP) that provides web analytics services to its customers (e.g., a web site owner) by visualizing the traffic data generated at a web site in accordance with various user requests. To do so, the server system 106 may include an analytics system 150 adapted for processing the raw traffic data of a web server 130 and other types of traffic data generated by the web server 130 through techniques such as page tagging. Note that the traffic data may include any type of user traffic (e.g., requests for static or dynamic web pages, traffic from mobile applications, requests by and request for Flash applications, etc.).

In some embodiments, the raw traffic data is obtained from log files 136 of the web servers 130. In these embodiments, the web servers 130 provide access to the log files 136 to the analytics system 150.

In some embodiments, the raw traffic data is obtained from log files 144 of a web server 140. In these embodiments, content providers insert tracking code (e.g., a script) into documents (e.g., web pages 132) for which the content providers desire to obtain traffic data. When these documents are accessed by users, the tracking code is executed and a request for a tracking object 142 (e.g., a specified image file) on the web server 140 is generated. In some embodiments, the request for the tracking object 142 includes parameters that provide information about the page being requested. In some embodiments, the parameters include predetermined variables and custom variables 134. The predetermined variables include attribute-value pairs defined by the analytics system 150. The custom variables 134 include attribute-value pairs defined by authors of the web pages 132. The custom variables 134 are described in more detail below. The request for the tracking object 142 is recorded in the log files 144, including any parameters associated with the request for the tracking object. In some embodiments, the web servers 130 include the tracking object 142 that the analytics system 150 uses to track hits to web pages 132. In these embodiments, the analytics system 150 obtains the log files from the web servers 130.

In some embodiments, the raw traffic data is transmitted directly from the client devices 102 to the analytics system 150. In these embodiments, content providers insert tracking code (e.g., a script) into documents (e.g., web pages 132) for which the content providers desire to obtain traffic data. When these documents are accessed by users, the tracking code is executed by the client devices 132 and a request for a tracking object 152 (e.g., a specified image file) on the server system 106 is generated. The analytics system 150 receives the request from the client devices 132, processes the raw traffic data, and stores attribute-value pairs associated with the raw traffic data in the database 124. In some embodiments, the request for the tracking object 152 includes parameters that provide information about the page being requested. In some embodiments, the parameters include predetermined variables and custom variables 134. The predetermined variables include attribute-value pairs defined by the analytics system 150. The custom variables 134 include attribute-value pairs defined by authors of the web pages 132. The custom variables 134 are described in more detail below.

Note that in any of the aforementioned techniques, the raw traffic data may be included in an activity file. For example, the activity file may be the log files 136, the log files 144, or the raw traffic data received directly from the client devices 132. Also note that for the sake of clarity, the disclosed embodiments are described with respect to using the web server 140 to tracking requests web pages of a web site using the tracking object 142 and log files 144. However, any of the techniques for acquiring raw traffic data may be used.

After the raw traffic data is obtained from the activity files, the raw web traffic data is first processed into a multidimensional dataset that includes multiple dimensions and multiple metric attributes (or measures) before the server system 106 can answer any data visualization requests through the web interface 108. A more detailed description of the processing of raw web traffic data can be found in the U.S. Provisional Patent Application No. 61/181,275, filed May 26, 2009, entitled "System and Method for Aggregating Analytics Data" and the U.S. Provisional Patent Application No. 61/181,276, filed May 26, 2009, entitled "Dynamically Generating Aggregate Tables," the contents of which are incorporated by reference herein in their entirety. For simplicity, it is assumed herein that the data records managed by the backend 120 and accessible to the server application 110 are not the raw web traffic data, but the data after being pre-processed. Note that the traffic data may be sessionized and/or aggregated.

Figure 2:
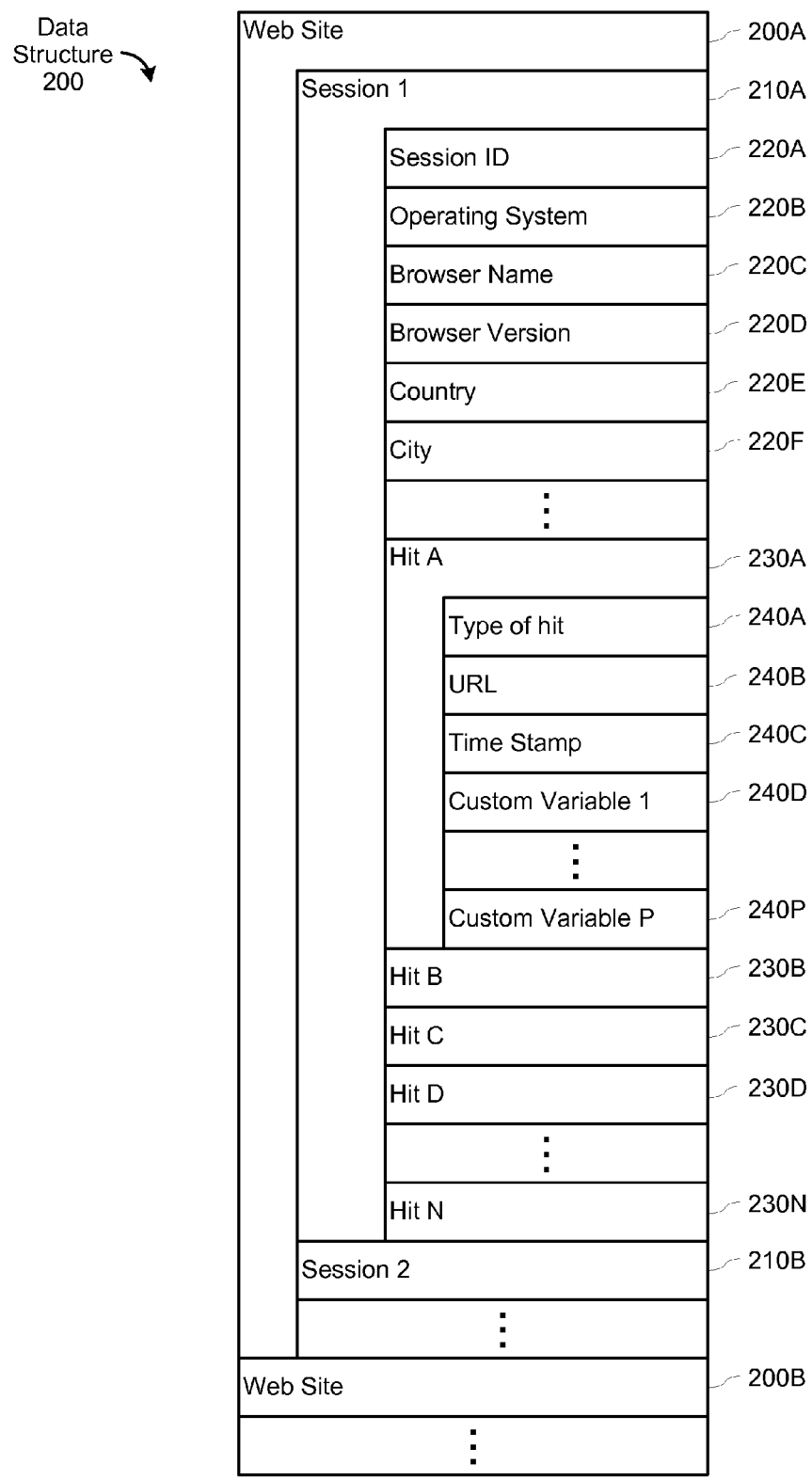
FIG. 2 is a block diagram of an exemplary data structure that stores traffic data at different web sites, according to some embodiments.

FIG. 2 is a block diagram of a data structure 200 used for storing the pre-processed web traffic data at different web sites in accordance with some embodiments. The web data stored in the data structure 200 have a hierarchical structure. The top level of the hierarchy corresponds to different web sites 200A, 200B (i.e., different web servers). For a respective web site, the traffic data is grouped into multiple sessions 210A, 210B, each session having a unique session ID 220. A session ID uniquely identifies a user's session with the web site 200A for the duration of that user's visit. Within a session 210A, other session-level attributes include operating system 220B (i.e., the operating system the computer runs on from which the user accesses the web site), browser name 220C (i.e., the web browser application used by the user for accessing the web site) and browser version 220D, geographical information of the computer such as the country 220E and the city 220F, etc.

For convenience and custom, the web traffic data of a user session (or a visit) is further divided into one or more hits 230A to 230N. Note that hits 230A to 230N are also referred to as "hit records" or "database hit records" 230A to 230N. Also note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 230A may be characterized by attributes such as type of hit 240A (e.g., transaction hit, etc.), referral URL 240B (i.e., the web page the visitor was on when the hit was generated), a timestamp 240C that indicates when the hit occurs and so on. Note that the session-level and hit-level attributes as shown in FIG. 2 are listed for illustrative purposes only. As will be shown in the examples below, a session or a hit may have many other attributes that either exist in the raw traffic data (e.g., the timestamp) or can be derived from the raw traffic data by the analytics system 150 (e.g., the average page views per session). In some embodiments, the hit 240A includes a plurality of custom variables 240D to 240P. Each custom variable is associated with a custom variable tag that includes a plurality of attribute-value pairs, as described below. In some embodiments, the hit 240A includes a plurality of predetermined variables defined by the analytics system 150. For example, the predetermined variable may include the type of hit 240A, the URL 240B, the time stamp 240C, etc.

Referring back to FIG. 1, a user at a client device 102 submits a request to the server system 106 for generating a report of the web traffic data associated with a particular web site. Upon receipt of the request, the server application 110 generates or identifies one or more queries and submits the queries to the backend server 120 that manages the web site's "sessionized" traffic data in the data structure 200 and processes the query results returned by the backend server 120 such that they can be visualized at the client device 102 in the form of a web analytics report. Note that the traffic data may also be aggregated.

The process of generating a web analytics report is described in detail in U.S. patent application Ser. No. 12/575,437, filed Oct. 7, 2009, entitled "Method and System for Generating and Sharing Dataset Segmentation Schemes," the content of which is incorporated by reference herein in its entirety.

Figure 3:
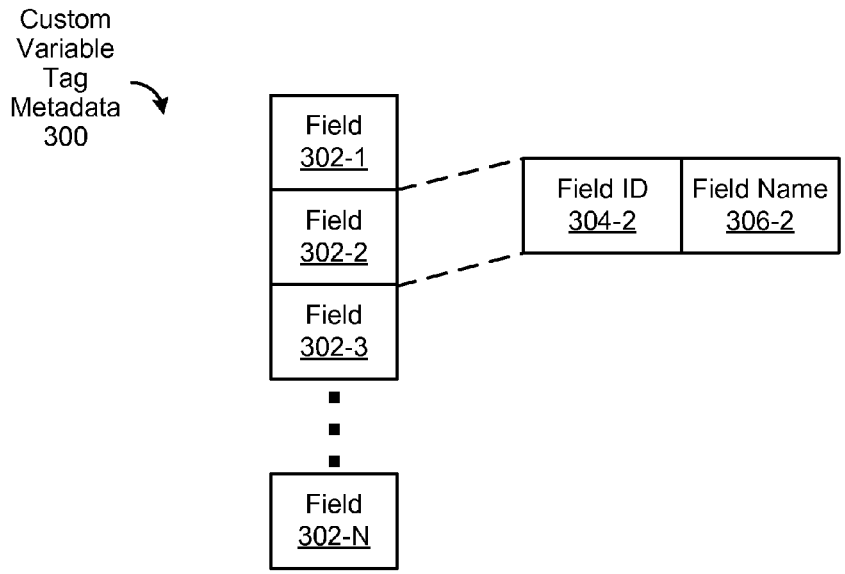
FIG. 3 is a block diagram of an exemplary data structure that stores metadata for custom variable tags, according to some embodiments.

FIG. 3 is a block diagram of an exemplary custom variable tag metadata data structure 300 that stores metadata for custom variable tags, according to some embodiments. In some embodiments, the custom variable tag metadata structure 300 is included in the custom variable data structures 127 in FIG. 1. Custom variable tag metadata data structure 300 is used to store metadata describing the various fields of a custom variable tag. As illustrated in FIG. 3, the custom variable tag metadata data structure 300 includes fields 302. A respective field 302-2 includes a field identifier 304-2 (e.g., an integer) and a field name 306-2. For example, FIG. 5 is a block diagram of exemplary values for a custom variable tag metadata 500, according to some embodiments. As illustrated in FIG. 5, the custom variable tag metadata 500 includes fields 502. Field 502-1 includes a field identifier 504-1 having a value "1" and a field name 506-1 having a value "Name" (e.g., an attribute name). Field 502-2 includes a field identifier 504-2 having a value "2" and a field name 506-2 having a value "Value" (e.g., a value corresponding to the attribute name). Field 502-3 includes a field identifier 504-3 having a value "3" and a field name 506-3 having a value "Scope" (e.g., the scope of the custom variable tag). Note that other attribute-value pairs may be defined in the custom variable tag metadata 500.

In some embodiments, a single custom variable tag metadata data structure is used to store metadata for custom variable tags across a number of web sites. In these embodiments, the field identifiers 304 are associated with respective web sites. In some embodiments, a separate and distinct custom variable tag metadata data structure for each web site is used to store metadata for custom variable tags for the web site.

In some embodiments, the fields 302 are defined by an operator of a web site. In some embodiments, the fields 302 are defined by the analytics system 150.

Figure 4:
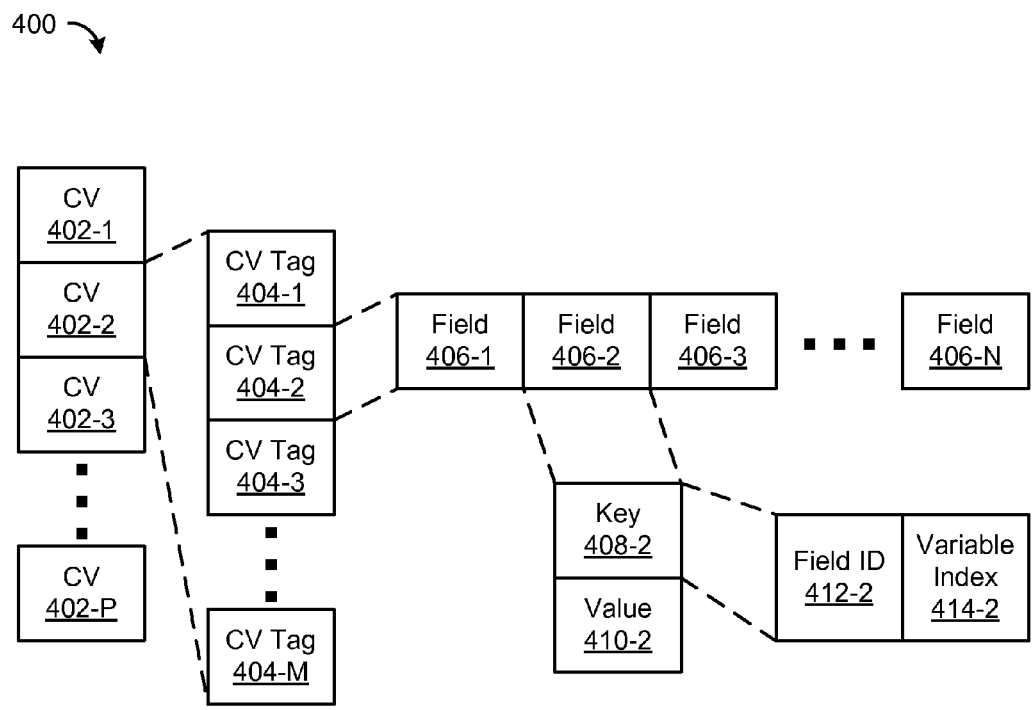
FIG. 4 is a block diagram of an exemplary data structure that stores custom variable tags associated with custom variables, according to some embodiments.

In some embodiments, the custom variable tag is one of a plurality of custom variable tags that authors of documents of the web site have assigned to the custom variable. FIG. 4 is a block diagram 400 of an exemplary data structure that stores custom variable tags 404 associated with custom variables 402, according to some embodiments. As illustrated in FIG. 4, a custom variable 402-2 is associated with a plurality of custom variable tags 404-1 to 404-M. A respective custom variable tag 404-2 includes a plurality of fields 406. A respective field 406-2 includes a key 408-2 and a value 410-2. The key 408-2 includes a field identifier 412-2 (e.g., the field identifier 304-2 in FIG. 3) and a variable index 414-2 indicating the custom variable with which the custom variable tag is associated (e.g., for custom variable 402-2, the variable index 414-2 may be "2").

In some embodiments, the first time that the web analytics system learns of the attribute-value pairs for a respective custom variable tag of a respective web page is when the respective web page is first visited. Prior to the first visit of the respective web page, the web analytics system does not know knowledge of the attribute-value pairs of the respective custom variable tag of the respective web page. In some embodiments, the user of the web analytics system only obtains knowledge of the one or more attribute-value pairs of the plurality of custom variable tags after the one or more attribute-value pairs of the plurality of custom variable tags are presented to the user by the web analytics system.

Figure 6:
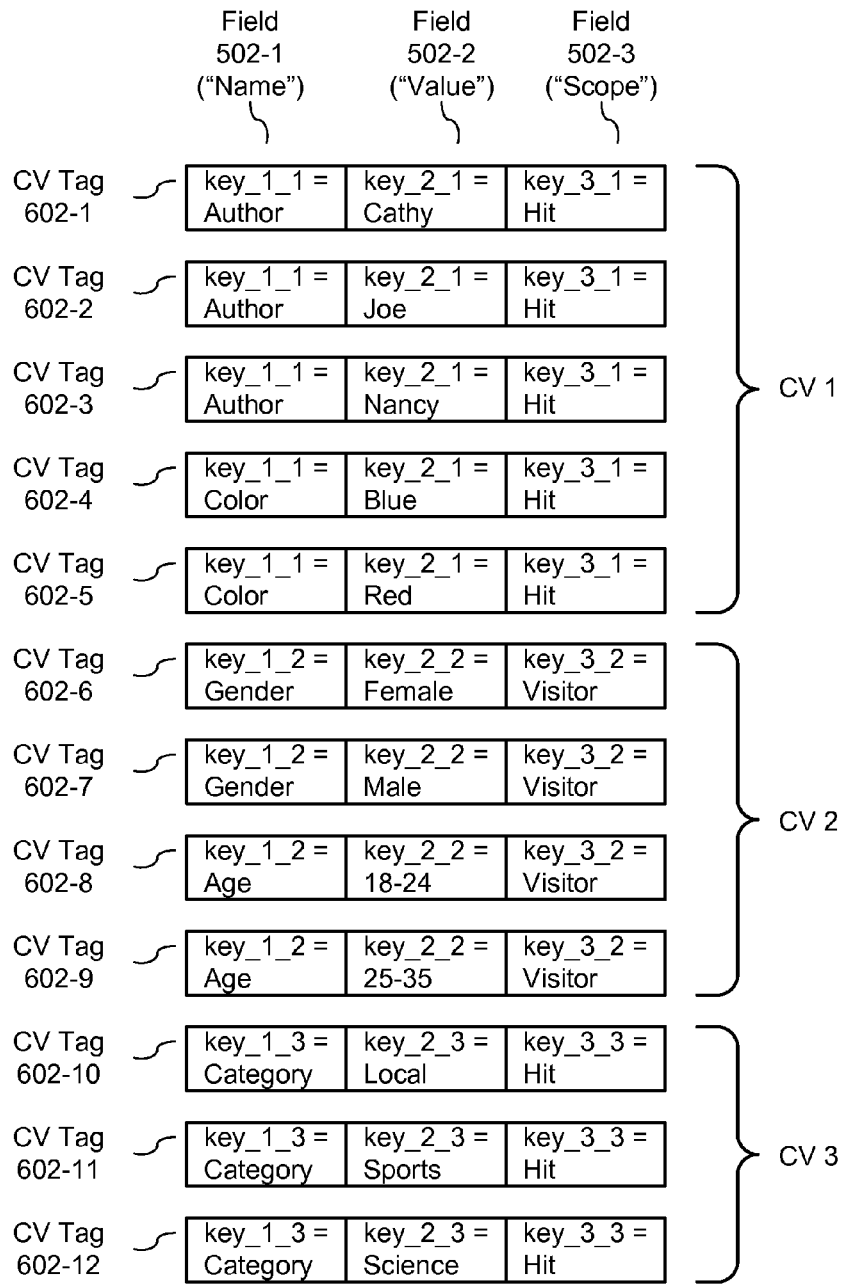
FIG. 6 is a block diagram of exemplary custom variable tags, according to some embodiments.

FIG. 6 is a block diagram 600 of exemplary custom variable tags 602 used on web pages of a web site, according to some embodiments. As illustrated in FIG. 6, a plurality of custom variable tags is assigned to each custom variable. For example, custom variable tags 602-1 to 602-5 are assigned to custom variable 1, custom variable tags 602-6 to 602-9 are assigned to custom variable 2, and custom variable tags 602-10 to 602-12 are assigned to custom variable 3. Each of the custom variable tags 602 include fields 502-1, 502-2, and 502-3. In this example, field 502-1 is a "Name" field indicating the name (or type) of an attribute represented by the custom variable tag, field 502-2 is a "Value" field indicating the value corresponding to the "Name" field, and field 502-3 is a "Scope" field indicating the scope of the custom variable tag. In some embodiments, the scope of a custom variable tag is selected from the group consisting of: "hit," indicating that the custom variable tag is related to a respective request for the document, "session," indicating that the custom variable tag is related to a respective user session, and "visitor," indicating that the custom variable tag is related to a respective user. A custom variable tag having a scope "hit" applies to all hits of a respective web page. A custom variable tag having a scope "session" applies to all hits of the respective web page in a session for a respective user. A custom variable tag having a scope "visitor" applies to all hits of the respective web page by a respective user.

In some embodiments, a respective custom variable tag includes a plurality of attribute-value pairs. In some embodiments, the custom variable tag includes a custom variable index attribute that includes a corresponding value specifying the custom variable with which the custom variable tag is associated. In some embodiments, the attribute of a respective attribute-value pair is denoted by a key that identifies a field identifier (e.g., the field identifier 304 in FIG. 3) and a custom variable index (e.g., an integer representing the custom variable number). For example, the key may be denoted as "key_fieldID_variableIndex," where "key" is a unique string that identifies the attribute-value pair as being part of a custom variable tag, "fieldID" is a field identifier (e.g., the field identifier 304 in FIG. 3), and variableIndex is the custom variable index (e.g., "3"). Thus, even if the field name of a field changes, the key of the field does not change. Note that the string "key" is can be any other string that uniquely identifies the attribute-value pairs as being part of a custom variable tag. In some embodiments, the custom variable tags are included into a web page using HTML tags that are not rendered in the web browser. For example, the custom variable tags may be included in HTML META tags or between HTML comment tags. Similarly, the custom variable tags may be inserted into a SCRIPT block.

FIG. 7 is a block diagram illustrating a number of exemplary custom variable tags assigned to web pages of a web site, according to some embodiments. For a web page 702, an author (or a content provider) of a web page 702 assigned the custom variable tag "key_1_1=Author," "key_2_1=Cathy," and "key_3_1=Hit" to custom variable 1 and the custom variable tag "key_1_3=Category," "key_2_3=Science," and "key_3_3=Hit" to custom variable 3. In the case of the custom variable tag "key_1_2=Gender," "key_2_2=Female," and "key_3_2=Visitor," the web server determined that the visitor of the web page 702 was a female visitor (e.g., via a profile of the visitor, etc.) and assigned this custom variable tag to custom variable 2 for this hit of the web page 702. Note that custom variables 1 and 3 for the web page 702 are assigned to the page itself and are logged for every hit (i.e., visit) of the web page 702 regardless of the user visiting the page. In contrast, custom variable 2 is a visitor-level custom variable and is only used in cases where the sex of the user is known.

For a web page 704, an author (or a content provider) of a web page 704 assigned the custom variable tag "key_1_1=Color," "key_2_1=Red," and "key_3_1=Hit" to custom variable 1 and the custom variable tag "key_1_3=Category," "key_2_3=Sports," and "key_3_3=Hit" to custom variable 3. In the case of the custom variable tag "key_1_2=Gender," "key_2_2=Female," and "key_3_2=Visitor," the web server determined that the visitor of the web page 704 was a female visitor (e.g., via a profile of the visitor, etc.) and assigned this custom variable tag to custom variable 2 for this hit of the web page 704. Again, custom variables 1 and 3 for the web page 702 are assigned to the page itself and are logged for every hit (i.e., visit) of the web page 702 regardless of the user visiting the page. In contrast, custom variable 2 is a visitor-level custom variable and is only used in cases where the sex of the user is known. Also note that the custom variables for each page are associated with different custom variable tags.

In some embodiments, when a user accesses a web page including custom variable tags, the client application 112 (e.g., a web browser) executes code (e.g., Javascript) for the web page that generates a request for a tracking object on a specified web server (e.g., the tracking object 142 on the web server 140). In some embodiments, the specified web server is selected from the group consisting of the web servers 130 to the web server 140. In some embodiments, the tracking object is a single pixel image file. In these embodiments, the request is a request for the single pixel image file. The request generates a request for a tracking object. In some embodiments, the request includes attribute-value pairs of the custom variable tags. For example, if the image file is located at a web server having the address http://www.example.com/image_file.gif and a user makes a request for the web page 702, the request may include query string as follows:
http://www.example.com/image_file.gif?key_1_1=Author&key_2_1=Cathy&key_3_1=Hit&key_1_2=Gender&key_2_2=Female&key_3_2=Visitor &key_1_3=Category&key_2_3=Science&key_3_3=Hit In some embodiments, each time a web page including custom variable tags is requested by a user, the attribute-value pairs for the custom variable tags are stored in a hit record (e.g., hit record 230A) for a user's session.

In some embodiments, the number of custom variables for a respective document of the web site is less than a predetermined number. For example, an operator of a web site may purchase five custom variables from a web analytics provider. Thus, the total number of custom variables available for any web page of the web site is five (i.e., the predetermined number is six).

In some embodiments, the document is associated with only one of the plurality of custom variable tags assigned to the custom variable of the web site. As discussed above, only one custom variable tag assigned to a particular custom variable may be used on a given web page.

In some embodiments, each time a web page including custom variable tags is requested by a user, the attribute-value pairs for the custom variable tags are stored in a custom variable data structure. FIG. 8 is a block diagram illustrating an exemplary custom variables data structure 800 that stores attribute-value pairs of a respective custom variable tag assigned to a web page, according to some embodiments. In some embodiments, the variables data structure 800 is included in the custom variable data structures 127 in FIG. 1. The custom variables data structure 800 includes values for fields 802-1 to 802-N and a value for variable index 804. In some embodiments, the custom variables data structure 800 includes a number of hits 806 associated with the values for fields 802-1 to 802-N. In some embodiments, the custom variables data structure 800 is a table in the database 124. In some embodiments, each web site has its own custom variables data structure. In some embodiments, a plurality of web sites shares a custom variables data structure.

Each of the fields 802-1 to 802-N corresponds to the attributes of the attribute-value pairs of custom variables for a respective web site. For example, the fields may include a "Name" field, a "Value" field, and a "Scope" field corresponding to the attributes "Name," "Value," and "Scope" of the attribute-value pairs of the custom variable tags for the web site. The variable index 804 indicates the custom variable to which the custom variable tag is assigned. Hits 806 indicate the number of times the set of attribute-value pairs of the custom variable tags has been accessed by users of the web site.

The attribute-value pairs for each custom variable tag accessed by visitors of web pages are extracted from the log files 144 and stored in the custom variables data structure 800. In some embodiments, only unique sets of attribute-value pairs of custom variable tags for a web site are stored into the custom variables data structure 800. Each time a set of attribute-value pairs of custom variable tags for a web site is extracted from the log files 144, the number of hits for the respective set of attribute-value pairs is incremented by one.

Some embodiments provide a data structure (e.g., the custom variables data structure 800) configured for use by a computer to store one or more attribute-value pairs associated with a plurality of custom variables, wherein the data structure includes a name data field configured to store a value corresponding to a name attribute of a respective custom variable, a value data field configured to store a value corresponding to a value attribute of the respective custom variable, and a scope data field configured to store a value corresponding to a scope attribute of the respective custom variable. FIG. 9 is a block diagram illustrating exemplary custom variables table 900 storing exemplary attribute-value pairs of custom variable tags assigned to web pages of a web site, according to some embodiments. In some embodiments, the custom variables table 900 is included in the custom variable data structures 127 in FIG. 1. In this example, the fields include a name field 902, a value field 904, a scope field 906, a variable index field 908, and a hits field 910. The name field 902, the value field 904, and the scope field 906 correspond to the attributes of attribute-value pairs for the custom variable tags of the web site. As illustrated in FIG. 9, custom variable 1 is associated with five sets of attribute-value pairs extracted from custom variable tags of web pages accessed by users, custom variable 2 is associated with four sets of attribute-value pairs extracted from custom variable tags of web pages accessed by users, custom variable 3 is associated with three sets of attribute-value pairs extracted from custom variable tags of web pages accessed by users. FIG. 9 also shows that if a respective set of attribute-value pairs is accessed more than once, the number of hits for the respective set of attribute-value pairs is accumulated in the field hits 910. For example, the set of attribute-value pairs "Name=Author", "Value=Nancy", "Scope=Hit" was accessed 3 times by users of the web site.

In some embodiments, the author of a web page and a user of the analytics system 150 are separate and distinct users. In these embodiments the user of the analytics system 150 does not have prior knowledge of which attribute-value pairs have been assigned to which custom variables by the authors (or content providers) of web pages of the web site. In these embodiments, the analytics system 150 presents the attribute-value pairs assigned to the custom variables to the user of the analytics system 150. The custom variables data structure 800 tracks the attribute-value pairs of the custom variable tags defined by the authors (or content providers) of the web site and accessed by users of the web site. The analytics system 150 then uses the data stored in the custom variables tag data structure 800 to report these attribute-value pairs to the users of the analytics system 150. Thus, the users of the analytics system 150 can request analytics data for a web site without the need to know beforehand which the attribute-value pairs have been assigned to which custom variables.

Figure 10:
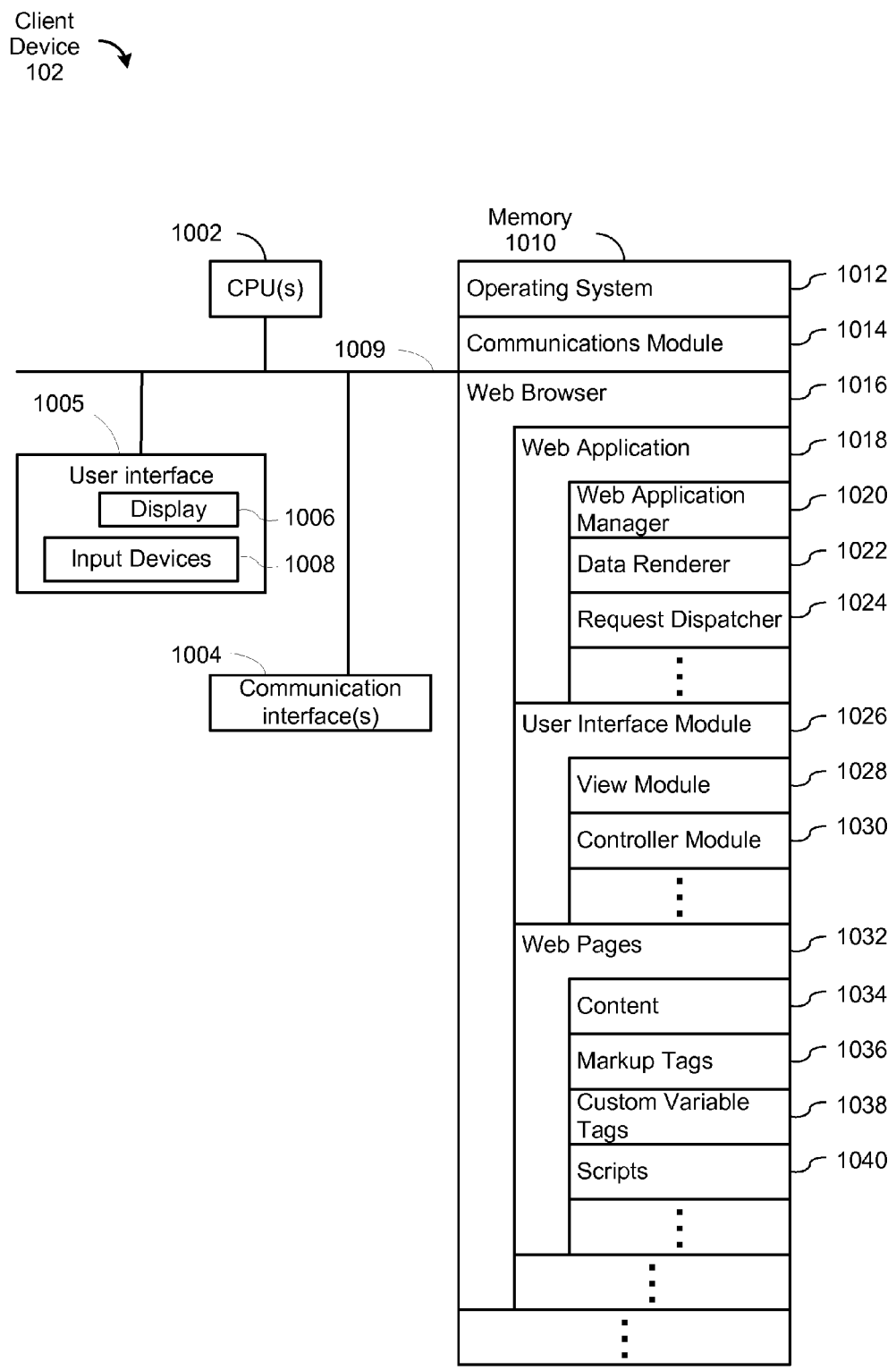
FIG. 10 is a block diagram of a client device for accessing web analytics data, according to some embodiments.

FIG. 10 is a block diagram of a client device 102 for visualizing web traffic data, according to some embodiments. The client device 102 generally includes one or more processing units (CPU's) 1002, one or more network or other communications interfaces 1004, memory 1010, and one or more communication buses 1009 for interconnecting these components. The communication buses 1009 may include circuitry (sometimes called a chipset) that interconnects and controls communications between components. The client device 1002 may optionally include a user interface 1005, for instance, a display device 1006, input devices 1008 (e.g., a keyboard, a mouse, a track pad, a touch-sensitive surface, etc.). Memory 1010 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 1010 may include mass storage that is remotely located from the central processing unit(s) 1002. Memory 1010, or alternately the non-volatile memory device(s) within memory 1010, comprises a computer readable storage medium. Memory 1010 or the computer readable storage medium of memory 1010 stores the following elements, or a subset of these elements, and may also include additional elements:

- an operating system 1012 that includes procedures for handling various basic system services and for performing hardware dependent tasks;
- a communication module 1014 that is used for connecting the client device 102 to other servers or computers including the server system 106, web servers 130, and web server 140, via one or more communication network interfaces 1004 (wired or wireless), such as the Internet, other wide area networks, local area networks, and metropolitan area networks and so on;
- a web browser 1016 (e.g., the client application 112), including a web application manager 1020 (e.g., the client assistant 114) for managing the user interactions with the web browser, a data render 1022 for supporting the visualization of an analytics report, and a request dispatcher 1024 for submitting user requests for new analytics reports;
- a user interface module 1026, including a view module 1028 and a controller module 1030, for detecting user instructions to control the visualization of the analytics reports;
- web pages 1032 including content 1034, markup tags 1036, custom variable tags 1038 (as described herein), and scripts 1040 (e.g., scripts for generating requests for the tracking object 142).

Figure 11:
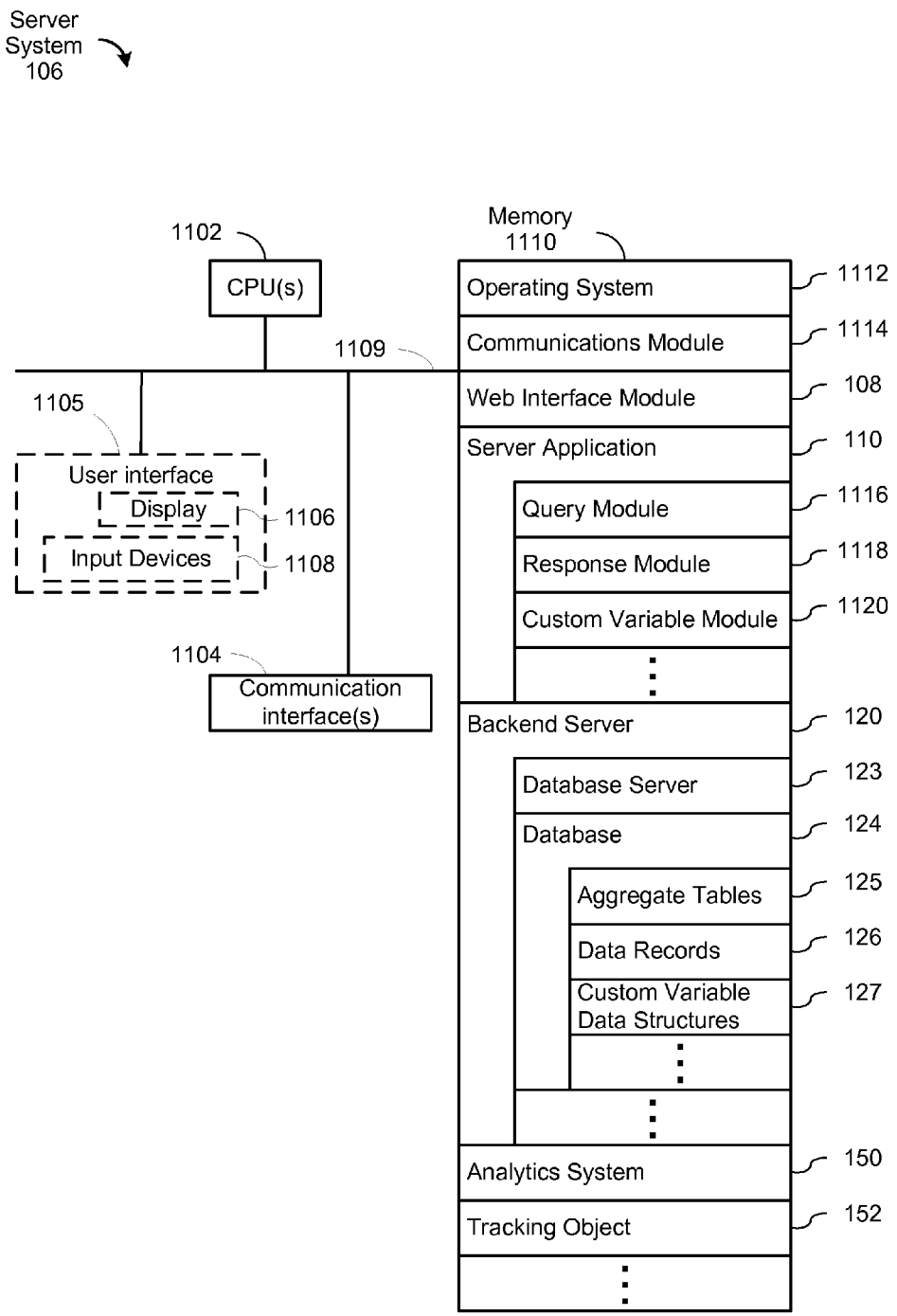
FIG. 11 is a block diagram of a server system for presenting and providing access to custom variables for web analytics to be displayed at a requesting client device, according to some embodiments.

FIG. 11 is a block diagram of a server system 106 for generating views of traffic data to be displayed at a requesting client device, according to some embodiments. The server system 106 generally includes one or more processing units (CPU's) 1102, one or more network or other communications interfaces 1104, memory 1110, and one or more communication buses 1109 for interconnecting these components. The server system 106 may optionally include a user interface 1105 comprising a display device 1106 and input devices 1108 (e.g., a keyboard, a mouse, a track pad, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 may optionally include one or more storage devices remotely located from the CPU(s) 1102. Memory 1110, or alternately the non-volatile memory device(s) within memory 1110, comprises a computer readable storage medium. Memory 1110 or the computer readable storage medium of memory 1110 stores the following elements, or a subset of these elements, and may also include additional elements:

- an operating system 1112 that includes procedures for handling various basic system services and for performing hardware dependent tasks;
- a network communication module 1113 that is used for connecting the server system 106 to other computers such as the clients 102 and the web servers 130 and 140 via the communication network interfaces 1104 (wired or wireless) and one or more communication networks, such as the Internet, other wide area networks, local area networks, metropolitan area networks, and so on;
- a web interface module 108 for receiving requests from client devices and returning reports in response to the client requests;
- a server application 110, including a query module 1116 for converting client requests into one or more queries or data filters targeting at the backend 120, a response module 1118 for preparing analytics reports based on the response from the backend 120, and a custom variable module 1120 for processing requests for analytics data relating to custom variables as described herein;
- a backend 120 including a database server 123 and data records 126 such as the session data records shown in FIG. 2, and custom variables data structures 127 as described herein;
- a web analytics system 150 for pre-processing the log files into the sessionized web traffic data records 127; and
- a tracking object 152 that is a target of requests that provide raw web traffic data to the analytics system 150.

Figure 12:
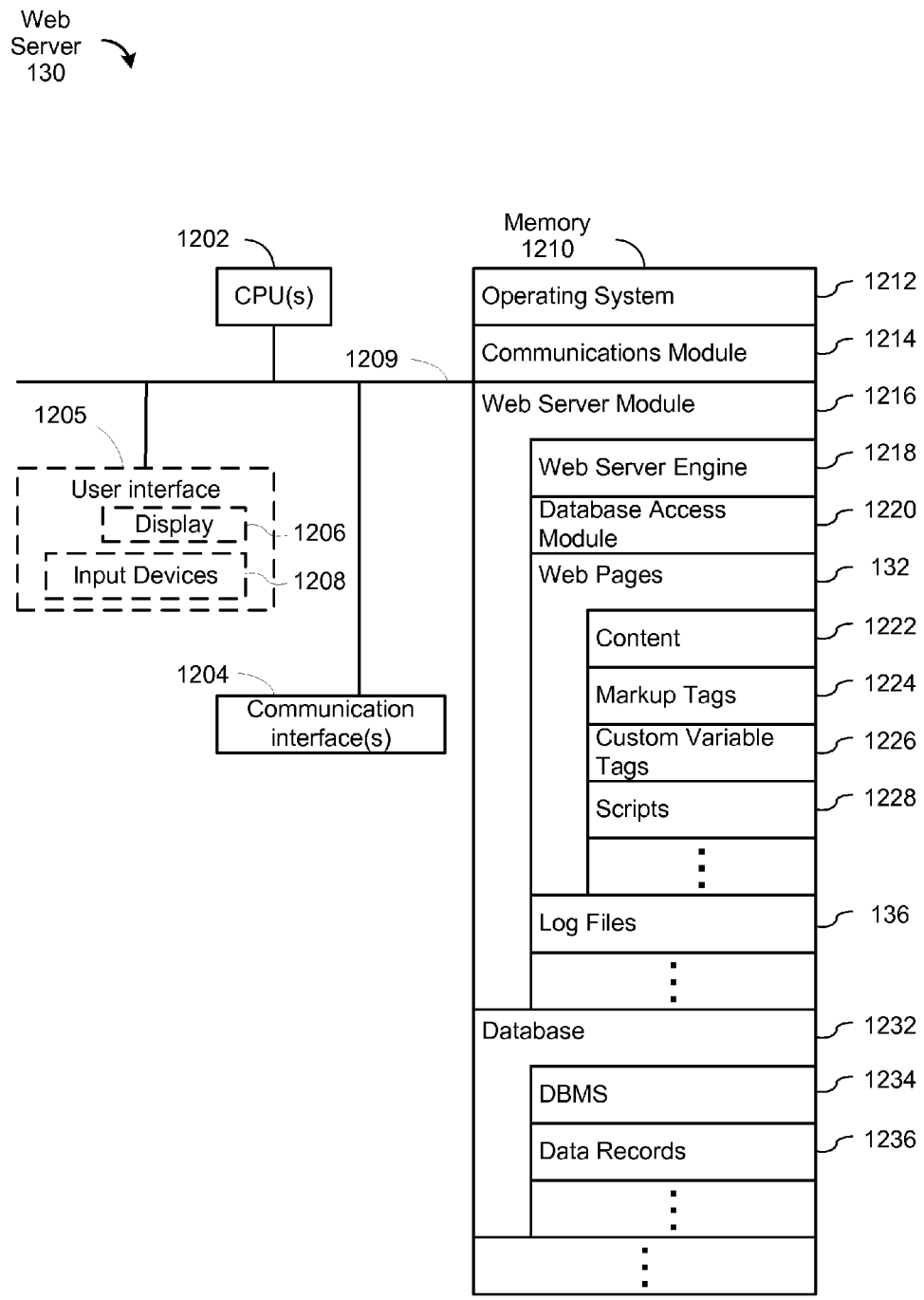
FIG. 12 is a block diagram of a web server for serving web pages to client devices, according to some embodiments.

FIG. 12 is a block diagram of a web server 130 for serving web pages to client devices 102, according to some embodiments. The web server 130 generally includes one or more processing units (CPU's) 1202, one or more network or other communications interfaces 1204, memory 1210, and one or more communication buses 1209 for interconnecting these components. The web server 130 may optionally include a user interface 1205 comprising a display device 1206 and input devices 1208 (e.g., a keyboard, a mouse, a track pad, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 may optionally include one or more storage devices remotely located from the CPU(s) 1202. Memory 1210, or alternately the non-volatile memory device(s) within memory 1210, comprises a computer readable storage medium. Memory 1210 or the computer readable storage medium of memory 1210 stores the following elements, or a subset of these elements, and may also include additional elements:

- an operating system 1212 that includes procedures for handling various basic system services and for performing hardware dependent tasks;
- a network communication module 1214 that is used for connecting the web server 130 to other computers such as the clients 102, the web server 140, and the server system 106 via the communication network interfaces 1204 (wired or wireless) and one or more communication networks, such as the Internet, other wide area networks, local area networks, metropolitan area networks, and so on;
- a web server module 1216 including a web server engine 1218 for receiving and responding to requests for web pages 132 from client devices 102, a database access module 1220 for accessing database 1232 of the web server 130, web pages 132 including content 1222, markup tags 1224, custom variable tags 1226 (as described herein), and scripts 1228 (e.g., scripts for generating requests for the tracking object 142), log files 136 including data related to accesses made by users of the web server 130; and
- a database 1232 including a database management system (DBMS) 1234 for providing an interface to access data records 1236 of the database 1232.

Figure 13:
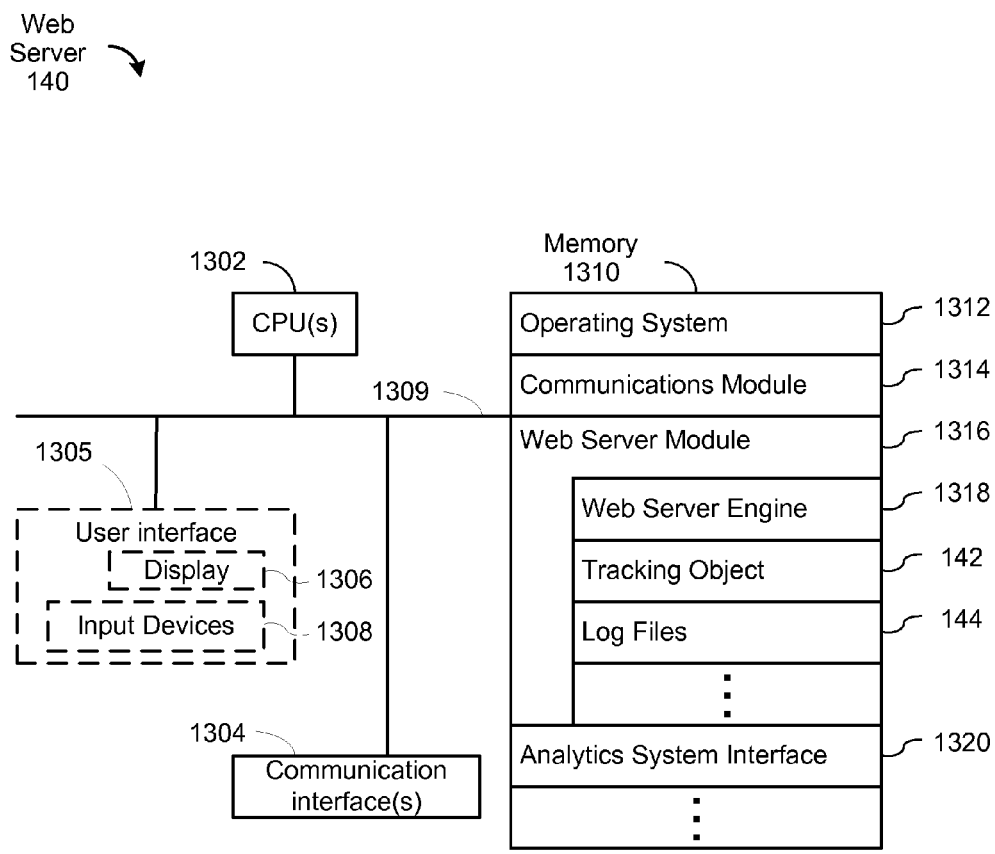
FIG. 13 is a block diagram of a web server for logging accesses by users of web sites hosted on one or more web servers, according to some embodiments.

FIG. 13 is a block diagram of a web server 140 for logging accesses by users of web sites hosted on web servers 130, according to some embodiments. The web server 140 generally includes one or more processing units (CPU's) 1302, one or more network or other communications interfaces 1304, memory 1310, and one or more communication buses 1309 for interconnecting these components. The web server 140 may optionally include a user interface 1305 comprising a display device 1306 and input devices 1308 (e.g., a keyboard, a mouse, a track pad, etc.). Memory 1310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1310 may optionally include one or more storage devices remotely located from the CPU(s) 1302. Memory 1310, or alternately the non-volatile memory device(s) within memory 1310, comprises a computer readable storage medium. Memory 1310 or the computer readable storage medium of memory 1310 stores the following elements, or a subset of these elements, and may also include additional elements:

- an operating system 1312 that includes procedures for handling various basic system services and for performing hardware dependent tasks;
- a network communication module 1314 that is used for connecting the web server 140 to other computers such as the clients 102, the web servers 130, and the server system 106 via the communication network interfaces 1304 (wired or wireless) and one or more communication networks, such as the Internet, other wide area networks, local area networks, metropolitan area networks, and so on;
- a web server module 1316 including a web server engine 1318 for receiving and responding to requests tracking object 142 and logging the requests including custom variable tags included in the request into log files 144; and
- an analytics system interface 1320 that provides an interface for the server system 106 to access the log files 144.

Each of the above-identified elements in FIGS. 10-13 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1010, 1110, 1210, 1310 may store a subset of the modules and data structures identified above. Furthermore, memory 1010, 1110, 1210, 1310 may store additional modules and data structures not described above.

FIGS. 10-13 are intended more as functional descriptions of the various features of a client device and server system rather than a structural schematic of the embodiments described herein. In practice, and as recognized by those of ordinary skill in the art, items shown separately could be combined and some items could be separated. For example, some items shown separately in FIG. 11 like the web interface module 108 and the server application 110 could be implemented on single servers and single items like the database 124 could be implemented by one or more servers. The actual number of server computers used to implement the server system 106, and how features are allocated among them will vary from one implementation to another, and may depend in part on the amount of data traffic that the system must handle during peak usage periods as well as during average usage periods.

Figure 14:
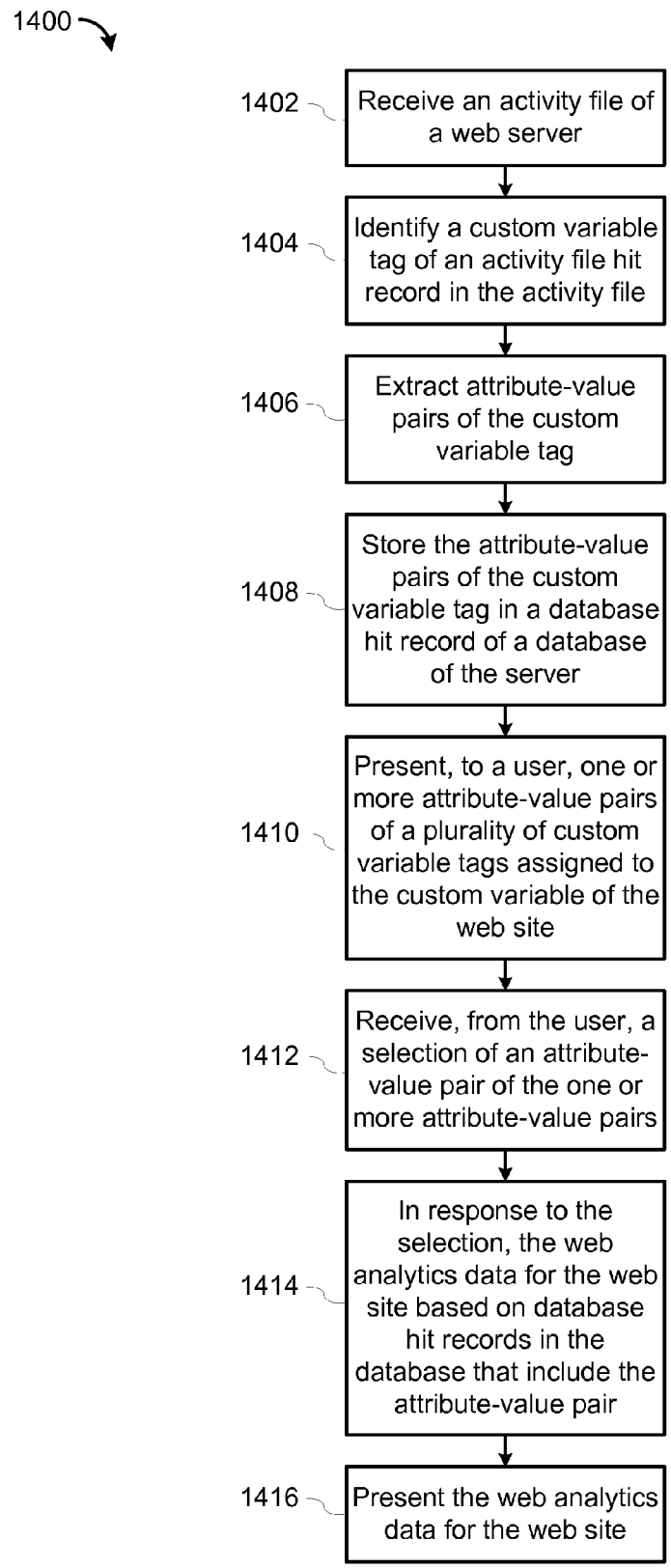
FIG. 14 is a flowchart of a method for presenting custom variables to a user of a web analytics system, according to some embodiments.

FIG. 14 is a flowchart of a method 1400 for presenting custom variables to a user of a web analytics system, according to some embodiments. The server system 106 receives (1402) an activity file of a web server, wherein the activity file includes activity file hit records that provide information about respective requests for documents made by visitors of web sites. The server system 106 then identifies (1404) a custom variable tag of an activity file hit record in the activity file, wherein the activity file hit record is associated with a web site, wherein the custom variable tag is defined by an author of a document of the web site, and wherein the custom variable tag is assigned to a custom variable of the web site.

The server system 106 extracts (1406) attribute-value pairs of the custom variable tag, wherein the attributes of the custom variable tag include at least a name attribute, a value attribute, and a scope attribute. In some embodiments, a value corresponding to the name attribute of the custom variable tag specifies a name of an attribute for the custom variable tag. In some embodiments, a value corresponding to the value attribute of the custom variable tag specifies a value corresponding to the name of the attribute for the custom variable tag. In some embodiments, a value corresponding to the scope attribute of the custom variable tag is selected from the group consisting of: "hit," indicating that the custom variable tag is related to a respective request for the document, "session," indicating that the custom variable tag is related to a respective user session, and "visitor," indicating that the custom variable tag is related to a respective user.

The server system 106 then stores (1408) the attribute-value pairs of the custom variable tag in a database hit record of a database of the server, wherein the database includes a plurality of database hit records including a plurality of attribute-value pairs extracted from a plurality of activity file hit records. The server system 106 presents (1410), to a user (e.g., an user of the analytics system 150), one or more attribute-value pairs of a plurality of custom variable tags assigned to the custom variable of the web site, wherein the user is separate and distinct from the authors of the documents of the web site.

The server system 106 then receives (1412), from the user, a selection of an attribute-value pair of the one or more attribute-value pairs, wherein the selection indicates a request for web analytics data for the web site corresponding to the attribute-value pair. In some embodiments, the web analytics data includes traffic data that is processed by the analytics system 150. In response to the selection, the server system 106 generates (1414) the web analytics data for the web site based on database hit records in the database that include the attribute-value pair. In some embodiments, the server system 106 generates the web analytics data by generating one or more charts based on the database hit records in the database that include the attribute-value pair. In some embodiments, the server system 106 generates the web analytics data by generating one or more graphs based on the database hit records in the database that include the attribute-value pair. In some embodiments, the server system 106 generates the web analytics data by generating one or more tables based on the database hit records in the database that include the attribute-value pair. In some embodiments, the server system 106 generates the web analytics data by calculating one or more statistics based on the database hit records in the database that include the attribute-value pair.

The server system 106 then presents (1416) the web analytics data for the web site. In some embodiments, the web site includes a plurality of custom variables. In these embodiments, the server system 106 presents, to a user, attribute-value pairs of custom variable tags assigned to the plurality of custom variables of the web site.

Figure 15:
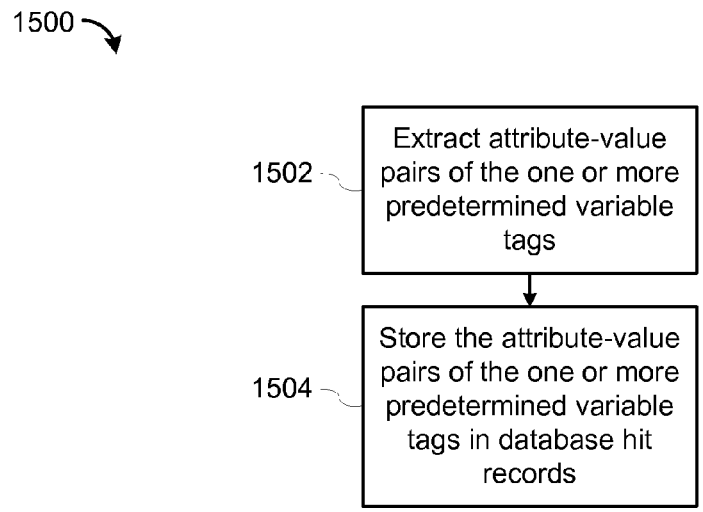
FIG. 15 is a flowchart of a method for storing predetermined variable tags in database hit records, according to some embodiments.

In some embodiments, the activity file hit record includes one or more predetermined variable tags that are assigned to corresponding predetermined variables, and wherein the one or more predetermined variable tags are defined by a web analytics system. FIG. 15 is a flowchart of a method 1500 for storing predetermined variable tags in database hit records, according to some embodiments. The server system 106 extracts (1502) attribute-value pairs of the one or more predetermined variable tags and stores (1504) the attribute-value pairs of the one or more predetermined variable tags in database hit records.

Figure 16:
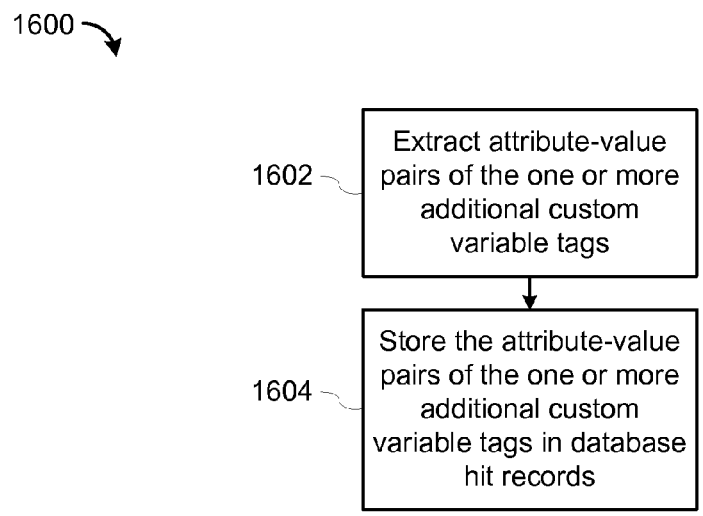
FIG. 16 is a flowchart of a method for storing presenting web analytics data based on custom variables, according to some embodiments.

In some embodiments, the activity file hit record includes one or more additional custom variable tags. FIG. 16 is a flowchart of a method 1600 for storing presenting web analytics data based on custom variables, according to some embodiments. The server system 106 extracts (1602) attribute-value pairs of the one or more additional custom variable tags and stores (1604) the attribute-value pairs of the one or more additional custom variable tags in database hit records.

Figure 17:
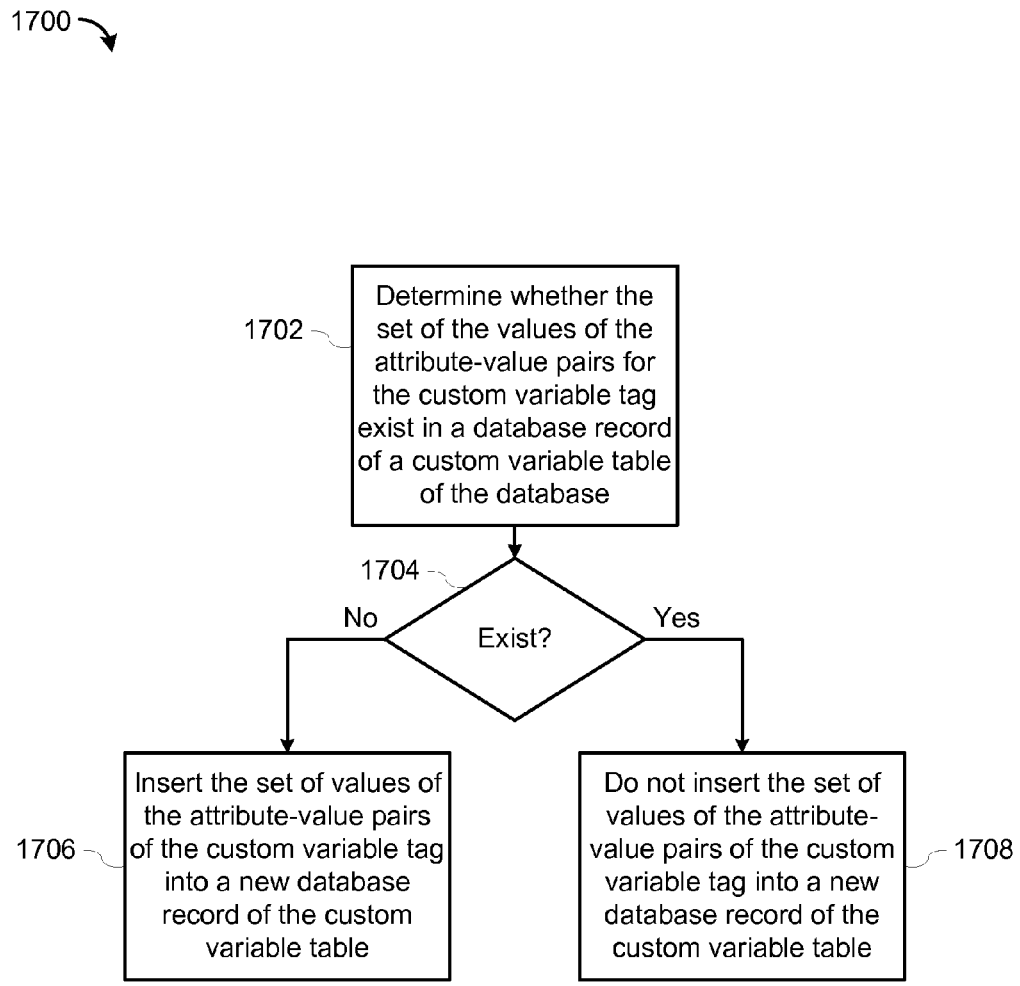
FIG. 17 is a flowchart of a method for storing custom variable tags into a custom variable table, according to some embodiments.

FIG. 17 is a flowchart of a method 1700 for storing custom variable tags into a custom variable table, according to some embodiments. The server system 106 determines (1702) whether the set of the values of the attribute-value pairs for the custom variable tag exist in a database record of a custom variable table of the database, wherein the custom variable table includes at least a name column corresponding to the name attribute, a value column corresponding to the value attribute, and a scope column corresponding to the scope attribute. If the set of the values of the attribute-value pairs for the custom variable tag does not exist in a database record of the custom variable table (1704, no), the server system 106 inserts (1706) the set of values of the attribute-value pairs of the custom variable tag into a new database record of the custom variable table. Otherwise (1704, no), the server system 106 does not insert (1708) the set of values of the attribute-value pairs of the custom variable tag into a new database record of the custom variable table.

In some embodiments, authors define the custom variable tags. In these embodiments, the analytics system 150 does not have knowledge of the attribute-value pairs of the custom variable tags until a hit including the custom variable tag is registered in the analytics system 150. These embodiments allow the authors (or content providers) to arbitrarily assign custom variable tags to their allotment of custom variable for a web site.

In some embodiments, the value of the scope attribute is "session." In these embodiments, the server system 106 propagates the attribute-value pairs of the custom variable tag to database hit records associated with the same session as the database hit record.

In some embodiments, the value of the scope attribute is "visitor." In these embodiments, the server system 106 propagates the attribute-value pairs of the custom variable tag to database hit records associated with the same visitor as the database hit record.

Figure 18A:
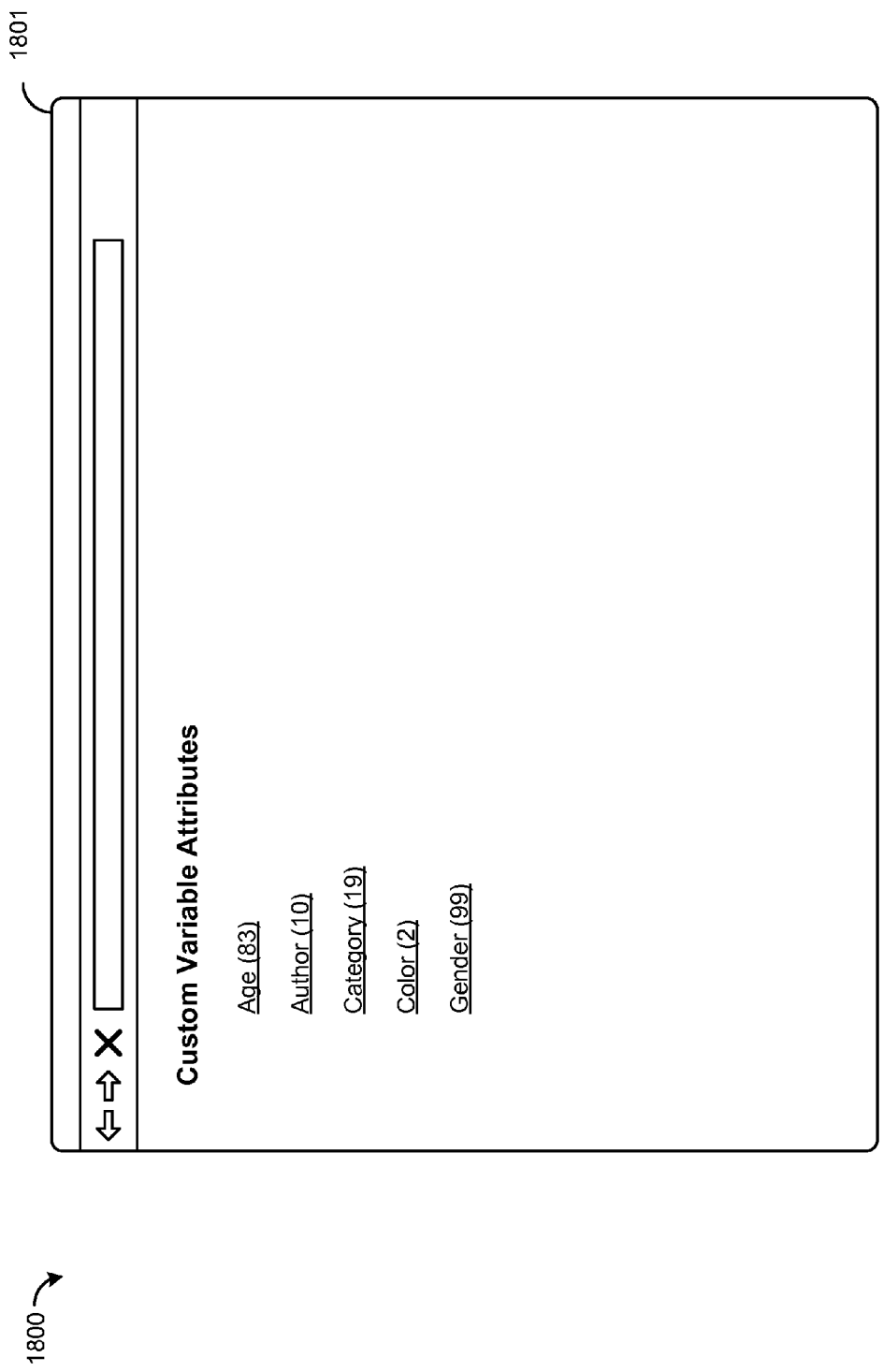
FIG. 18A is an exemplary screenshot of a custom variable report page, according to some embodiments.

FIG. 18A is an exemplary screenshot 1800 of a custom variable report page being displayed in a web browser window 1801, according to some embodiments. As illustrated in FIG. 18A, the custom variable report page presents the attribute names (i.e., "Name") of the custom variable tags. In some embodiments, the total number of hits for each attribute is presented along with the attribute names. For example, FIG. 18A illustrates that the attribute name "Age" has 83 hits associated with it. In some embodiments, the attribute names are hyperlinks to another custom variable report page that presents the values associated with those attributes.

Figure 18B:
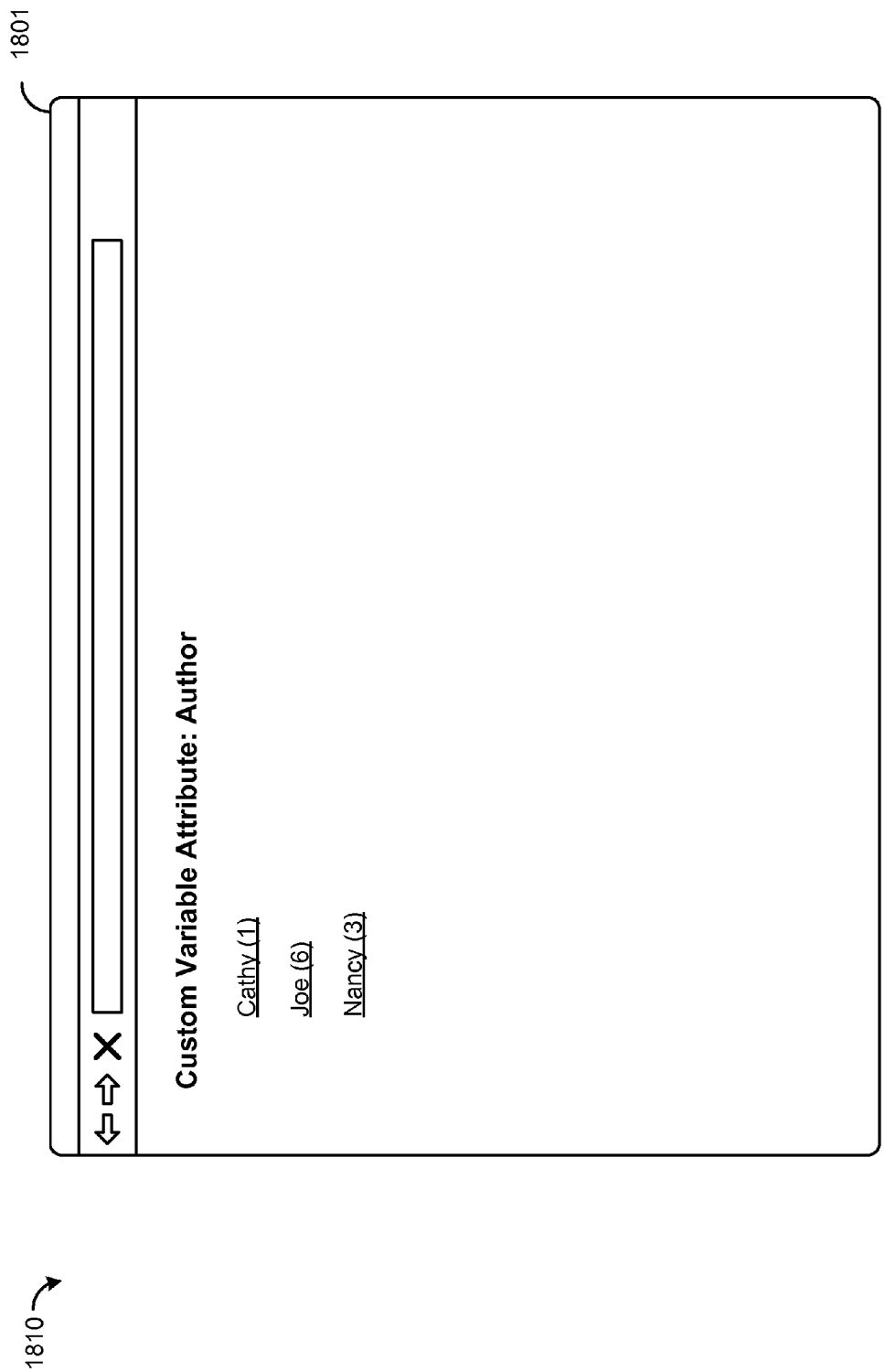
FIG. 18B is an exemplary screenshot of another custom variable report page, according to some embodiments.

FIG. 18B is an exemplary screenshot 1810 of another custom variable report page being displayed in the web browser window 1801, according to some embodiments. As illustrated in FIG. 18B, a user of a web analytics system selected the attribute name "Author." This page lists the values corresponding to the attribute names of the custom variable tags. In some embodiments, the total number of hits for each attribute is presented along with the values. For example, FIG. 18B illustrates that the value "Joe" has 6 hits associated with it.

In some embodiments, instead of two separate pages, the attribute names and corresponding values are presented on a single custom variable report page. In some embodiments, instead of two separate pages, only the values corresponding to the attribute names are presented on a single custom variable report page.

Figure 18C:
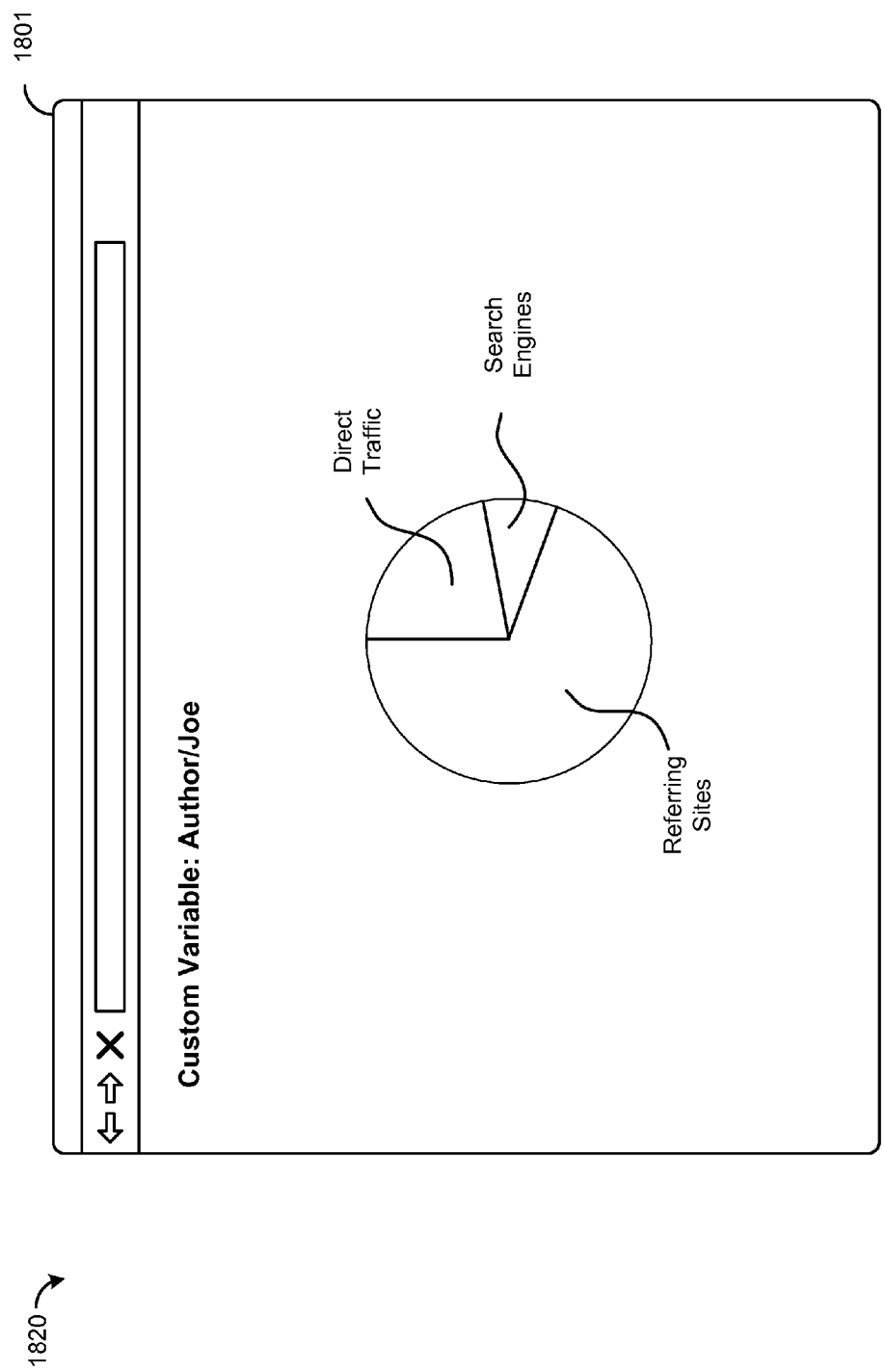
FIG. 18C is an exemplary screenshot of another custom variable report page, according to some embodiments.

FIG. 18C is an exemplary screenshot 1820 of another custom variable report page being displayed in the web browser window 1801, according to some embodiments. As illustrated in FIG. 18C, the user of the web analytics system selected the value "Joe." In response to the selection, the web analytics system generated a graph indicating the percentage of hits from respective sources that accessed web pages having the attribute "Author" and a value "Joe." Note that the traffic data may be presented using other types of visualization techniques (e.g., other graphs, tables, etc.).

The methods 1400-1700 may be governed by instructions that are stored in a computer readable storage medium and that are executed by one or more processors of one or more servers. Each of the operations shown in FIGS. 14-17 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for presenting custom variables to a user of a web analytics system, comprising:
   receiving an activity file of a web server, wherein the activity file includes activity file hit records that provide information about respective requests for documents made by visitors of web sites;
   identifying a custom variable tag of an activity file hit record in the activity file, wherein the activity file hit record is associated with a web site, wherein the custom variable tag is defined by an author of a document of the web site, and wherein the custom variable tag is assigned to a custom variable of the web site for tracking visitors' activities at the web site;
   extracting attribute-value pairs of the custom variable tag, wherein the attributes of the custom variable tag include at least a name attribute, a value attribute, and a scope attribute;
   storing the attribute-value pairs of the custom variable tag in a database hit record of a database, wherein the database includes a plurality of database hit records including a plurality of attribute-value pairs extracted from a plurality of activity file hit records; and
   preparing for presenting, to a user, one or more attribute-value pairs of a plurality of custom variable tags assigned to the custom variable of the web site, wherein the user is separate and distinct from the authors of the documents of the web site.

2. The computer-implemented method of claim 1, wherein the activity file hit record includes one or more predetermined variable tags that are assigned to corresponding predetermined variables, and wherein the one or more predetermined variable tags are defined by a web analytics system.

3. The computer-implemented method of claim 2, further comprising:
   extracting attribute-value pairs of the one or more predetermined variable tags; and
   storing the attribute-value pairs of the one or more predetermined variable tags in database hit records.

4. The computer-implemented method of claim 1, wherein the activity file hit record includes one or more additional custom variable tags, and wherein the method further comprises:
   extracting attribute-value pairs of the one or more additional custom variable tags; and
   storing the attribute-value pairs of the one or more additional custom variable tags in database hit records.

5. The computer-implemented method of claim 1, further comprising:
   receiving, from the user, a selection of an attribute-value pair of the one or more attribute-value pairs, wherein the selection indicates a request for web analytics data for the web site corresponding to the attribute-value pair; and
   in response to the selection,
      generating the web analytics data for the web site based on database hit records in the database that include the attribute-value pair, and
      preparing for presenting the web analytics data for the web site.

6. The computer-implemented method of claim 5, wherein generating the web analytics data for the web site based on the database hit records in the database that include the attribute-value pair includes generating one or more charts based on the database hit records in the database that include the attribute-value pair.

7. The computer-implemented method of claim 5, wherein generating the web analytics data for the web site based on the database hit records in the database that include the attribute-value pair includes generating one or more graphs based on the database hit records in the database that include the attribute-value pair.

8. The computer-implemented method of claim 5, wherein generating the web analytics data for the web site based on the database hit records in the database that include the attribute-value pair includes calculating one or more statistics based on the database hit records in the database that include the attribute-value pair.

9. The computer-implemented method of claim 1, wherein a value corresponding to the name attribute of the custom variable tag specifies a name of an attribute for the custom variable tag.

10. The computer-implemented method of claim 1, wherein a value corresponding to the value attribute of the custom variable tag specifies a value corresponding to the name of the attribute for the custom variable tag.

11. The computer-implemented method of claim 1, wherein a value corresponding to the scope attribute of the custom variable tag is selected from the group consisting of:
    hit, indicating that the custom variable tag is related to a respective request for the document;
    session, indicating that the custom variable tag is related to a respective user session; and
    visitor, indicating that the custom variable tag is related to a respective user.

12. The computer-implemented method of claim 1, wherein the value of the scope attribute is session, and wherein the method further comprises propagating the attribute-value pairs of the custom variable tag to database hit records associated with the same session as the database hit record.

13. The computer-implemented method of claim 1, wherein the value of the scope attribute is visitor, and wherein the method further comprises propagating the attribute-value pairs of the custom variable tag to database hit records associated with the same visitor as the database hit record.

14. The computer-implemented method of claim 1, wherein the web site includes a plurality of custom variables, and wherein the method further comprises preparing for presenting, to a user, attribute-value pairs of custom variable tags assigned to the plurality of custom variables of the web site.

15. The computer-implemented method of claim 1, wherein the custom variable tag includes a custom variable index attribute that includes a corresponding value specifying the custom variable with which the custom variable tag is associated.

16. The computer-implemented method of claim 1, wherein the number of custom variables for a respective document of the web site is less than a predetermined number.

17. The computer-implemented method of claim 1, wherein the document is associated with only one of the plurality of custom variable tags assigned to the custom variable of the web site.

18. The computer-implemented method of claim 1, wherein the custom variable tag is one of a plurality of custom variable tags that authors of documents of the web site have assigned to the custom variable.

19. The computer-implemented method of claim 1, wherein the user only obtains knowledge of the one or more attribute-value pairs of the plurality of custom variable tags after the one or more attribute-value pairs of the plurality of custom variable tags are presented to the user.

20. The computer-implemented method of claim 1, further comprising:
   determining whether the set of the values of the attribute-value pairs for the custom variable tag exist in a database record of a custom variable table of the database, wherein the custom variable table includes at least a name column corresponding to the name attribute, a value column corresponding to the value attribute, and a scope column corresponding to the scope attribute;
   if the set of the values of the attribute-value pairs for the custom variable tag does not exist in a database record of the custom variable table, inserting the set of values of the attribute-value pairs of the custom variable tag into a new database record of the custom variable table.

21. An analytics system, comprising:
   one or more processors;
   memory; and
   one or more programs stored in the memory, the one or more programs comprising instructions to:
      receive an activity file of a web server, wherein the activity file includes activity file hit records that provide information about respective requests for documents made by visitors of web sites;
      identify a custom variable tag of an activity file hit record in the activity file, wherein the activity file hit record is associated with a web site, wherein the custom variable tag is defined by an author of a document of the web site, and wherein the custom variable tag is assigned to a custom variable of the web site for tracking visitors' activities at the web site;
      extract attribute-value pairs of the custom variable tag, wherein the attributes of the custom variable tag include at least a name attribute, a value attribute, and a scope attribute;
      store the attribute-value pairs of the custom variable tag in a database hit record of a database of the server, wherein the database includes a plurality of database hit records including a plurality of attribute-value pairs extracted from a plurality of activity file hit records; and
      prepare to present, to a user, one or more attribute-value pairs of a plurality of custom variable tags assigned to the custom variable of the web site, wherein the user is separate and distinct from the authors of the documents of the web site.

22. A computer readable storage medium storing one or more programs configured for execution by one or more processors, the one or more programs comprising instructions to:
   receive an activity file of a web server, wherein the activity file includes activity file hit records that provide information about respective requests for documents made by visitors of web sites;
   identify a custom variable tag of an activity file hit record in the activity file, wherein the activity file hit record is associated with a web site, wherein the custom variable tag is defined by an author of a document of the web site, and wherein the custom variable tag is assigned to a custom variable of the web site for tracking visitors' activities at the web site;
   extract attribute-value pairs of the custom variable tag, wherein the attributes of the custom variable tag include at least a name attribute, a value attribute, and a scope attribute;
   store the attribute-value pairs of the custom variable tag in a database hit record of a database of the server, wherein the database includes a plurality of database hit records including a plurality of attribute-value pairs extracted from a plurality of activity file hit records; and
   prepare to present, to a user, one or more attribute-value pairs of a plurality of custom variable tags assigned to the custom variable of the web site, wherein the user is separate and distinct from the authors of the documents of the web site.

* * * * *